US012794370B2

(12) United States Patent
Park et al.

(10) Patent No.: US 12,794,370 B2
(45) Date of Patent: Nov. 10, 2026

(54) BUCK-BOOST CONVERTER WITH REDUCED RIPPLE VOLTAGE AND ELECTRONIC DEVICE INCLUDING THE SAME

(71) Applicant: SAMSUNG ELECTRONICS CO., LTD., Suwon-si (KR)

(72) Inventors: Jeonggyu Park, Suwon-si (KR); Jongyoung Lee, Suwon-si (KR); Seungwoo Jwa, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 218 days.

(21) Appl. No.: 18/220,042

(22) Filed: Jul. 10, 2023

(65) Prior Publication Data

US 2024/0120839 A1 Apr. 11, 2024

Related U.S. Application Data

(63) Continuation of application No. PCT/KR2023/009314, filed on Jul. 3, 2023.

(30) Foreign Application Priority Data

Oct. 6, 2022 (KR) ........................ 10-2022-0127947

(51) Int. Cl.
*H02M 3/158* (2006.01)
*H02M 1/00* (2006.01)
(Continued)

(52) U.S. Cl.
CPC ....... *H02M 3/1582* (2013.01); *H02M 1/0006* (2021.05); *H02M 1/08* (2013.01); *H02M 1/143* (2013.01)

(58) Field of Classification Search
CPC ...... H02M 3/1582; H02M 1/08; H02M 1/143; H02M 1/0045; H02M 1/14; H02M 1/0006
See application file for complete search history.

(56) References Cited

U.S. PATENT DOCUMENTS 2,258,259 A 10/1941 Ogden
8,064,372 B2 11/2011 Kim
(Continued)

FOREIGN PATENT DOCUMENTS

CN 109217671 A 1/2019
CN 110912402 A * 3/2020 .............. H02M 3/10
(Continued)

OTHER PUBLICATIONS

International Search Report (PCT/ISA/210) issued Oct. 26, 2023 by the International Searching Authority in International Patent Application No. PCT/KR2023/009314.
(Continued)

*Primary Examiner* — Jeffrey A Gblende
*Assistant Examiner* — Jye-June Lee
(74) *Attorney, Agent, or Firm* — Sughrue Mion, PLLC

(57) ABSTRACT

A converter of a wireless communication system includes a first circuit configured to perform a buck operation, a second circuit configured to perform a boost operation, an inductor coupling the first circuit and the second circuit, and a third circuit including a first resistor and a first diode. The first circuit includes a first field effect transistor (FET), a second FET, a first capacitor, and a first drive circuit. The second circuit includes a third FET, a fourth FET, a second capacitor, a first Zener diode, and a second drive circuit, and the first Zener diode. The third circuit is coupled to a first node to which the first drive circuit and the first capacitor are coupled and is coupled to a second node to which the second
(Continued)

drive circuit, the second capacitor, and the first Zener diode are coupled.

20 Claims, 8 Drawing Sheets

(51) Int. Cl.
*H02M 1/08* (2006.01)
*H02M 1/14* (2006.01)

(56) References Cited

U.S. PATENT DOCUMENTS

| | | | | |
|---|---|---|---|---|
| 9,122,294 | B2 | 9/2015 | Liu et al. | |
| 9,479,055 | B2 | 10/2016 | Okamatsu et al. | |
| 10,447,163 | B2 | 10/2019 | Kanda et al. | |
| 10,491,112 | B2 | 11/2019 | Li | |
| 2011/0227550 | A1 | 9/2011 | Walters et al. | |
| 2013/0021015 | A1* | 1/2013 | Moussaoui | H02M 3/1582 323/311 |
| 2014/0077870 | A1* | 3/2014 | Liu | H02M 3/1582 327/540 |
| 2014/0217959 | A1* | 8/2014 | Chen | H02M 3/1582 323/311 |
| 2018/0109179 | A1* | 4/2018 | Zhao | H02M 3/1582 |
| 2019/0326817 | A1* | 10/2019 | Zhang | H02M 3/1582 |
| 2021/0067182 | A1* | 3/2021 | Ravi | H04B 1/0458 |
| 2022/0085718 | A1* | 3/2022 | Singh | H02M 3/1582 |
| 2022/0123653 | A1* | 4/2022 | Youn | H02M 3/1582 |
| 2023/0246550 | A1* | 8/2023 | Guerra | H02M 3/1582 323/283 |
| 2024/0364220 | A1* | 10/2024 | Kim | H02M 3/1582 |

FOREIGN PATENT DOCUMENTS

| | | | | |
|---|---|---|---|---|
| CN | 110994995 | A * | 4/2020 | H02M 3/1584 |
| CN | 114337261 | A | 4/2022 | |
| KR | 10-2011-0105698 | A | 9/2011 | |
| KR | 10-1457704 | B1 | 11/2014 | |
| KR | 10-2020-0076903 | A | 6/2020 | |
| KR | 10-2020-0097529 | A | 8/2020 | |
| KR | 10-2021-0014520 | A | 2/2021 | |
| KR | 10-2634469 | B1 | 2/2024 | |

OTHER PUBLICATIONS

Written Opinion (PCT/ISA/237) issued Oct. 26, 2023 by the International Searching Authority in International Patent Application No. PCT/KR2023/009314.

* cited by examiner

BUCK-BOOST CONVERTER WITH REDUCED RIPPLE VOLTAGE AND ELECTRONIC DEVICE INCLUDING THE SAME

CROSS-REFERENCE TO RELATED APPLICATIONS

This application is a continuation application of International Application No. PCT/KR2023/009314 designating the United States, filed on Jul. 3, 2023, in the Korean Intellectual Property Receiving Office and claiming priority to Korean Patent Application No. 10-2022-0127947, filed on Oct. 6, 2022 in the Korean Intellectual Property Office, the disclosures of which are incorporated by reference herein in their entireties.

BACKGROUND

1. Field

The disclosure relates to a wireless communication system, and more particularly, to a buck-boost converter and an electronic device including the same.

2. Description of Related Art

In a base station, a power amplifier may generate an output signal in a radio frequency (RF) band that may require input power with minimized ripple for linearity. For the linearity, calibration of the power amplifier may be performed. Alternatively or additionally, an input power with a minimized ripple may be required for accurate calibration. An input end of the power amplifier may be connected to a converter for voltage variability.

SUMMARY

According to an aspect of the present disclosure, a converter of a wireless communication system is provided. The converter includes a first circuit configured to perform a buck operation, a second circuit configured to perform a boost operation, an inductor coupling the first circuit and the second circuit, and a third circuit including a first resistor and a first diode. The first circuit includes a first field effect transistor (FET), a second FET, a first capacitor, and a first drive circuit. The first capacitor is coupled to the first FET and the second FET. The first drive circuit is coupled to the first FET, the second FET, and the first capacitor. The second circuit includes a third FET, a fourth FET, a second capacitor, a second drive circuit, and a first Zener diode. The second capacitor is coupled to the third FET and the fourth FET. The second drive circuit is coupled to the third FET, the fourth FET, the second capacitor, and the first Zener diode. The third circuit is coupled to a first node to which the first drive circuit and the first capacitor are coupled and is coupled to a second node to which the second drive circuit, the second capacitor, and the first Zener diode are coupled.

According to an aspect of the present disclosure, a base station of a wireless communication system is provided. The base station includes at least one processor, a plurality of radio frequency (RF) chains coupled to the at least one processor, and a plurality of antenna elements coupled to the plurality of RF chains. Each RF chain of the plurality of RF chains includes a converter and a power amplifier. The converter includes a first circuit configured to perform a buck operation, a second circuit configured to perform a boost operation, an inductor coupling the first circuit and the second circuit, and a third circuit including a first resistor and a first diode. The first circuit includes a first FET, a second FET, a first capacitor, and a first drive circuit. The first capacitor is coupled to the first FET and the second FET. The first drive circuit is coupled to the first FET, the second FET, and the first capacitor. The second circuit includes a third FET, a fourth FET, a second capacitor, a second drive circuit, and a first Zener diode. The second capacitor is coupled to the third FET and the fourth FET. The second drive circuit is coupled to the third FET, the fourth FET, the second capacitor, and the first Zener diode. The third circuit is coupled to a first node to which the first drive circuit and the first capacitor are coupled and is coupled to a second node to which the second drive circuit, the second capacitor, and the first Zener diode are coupled.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
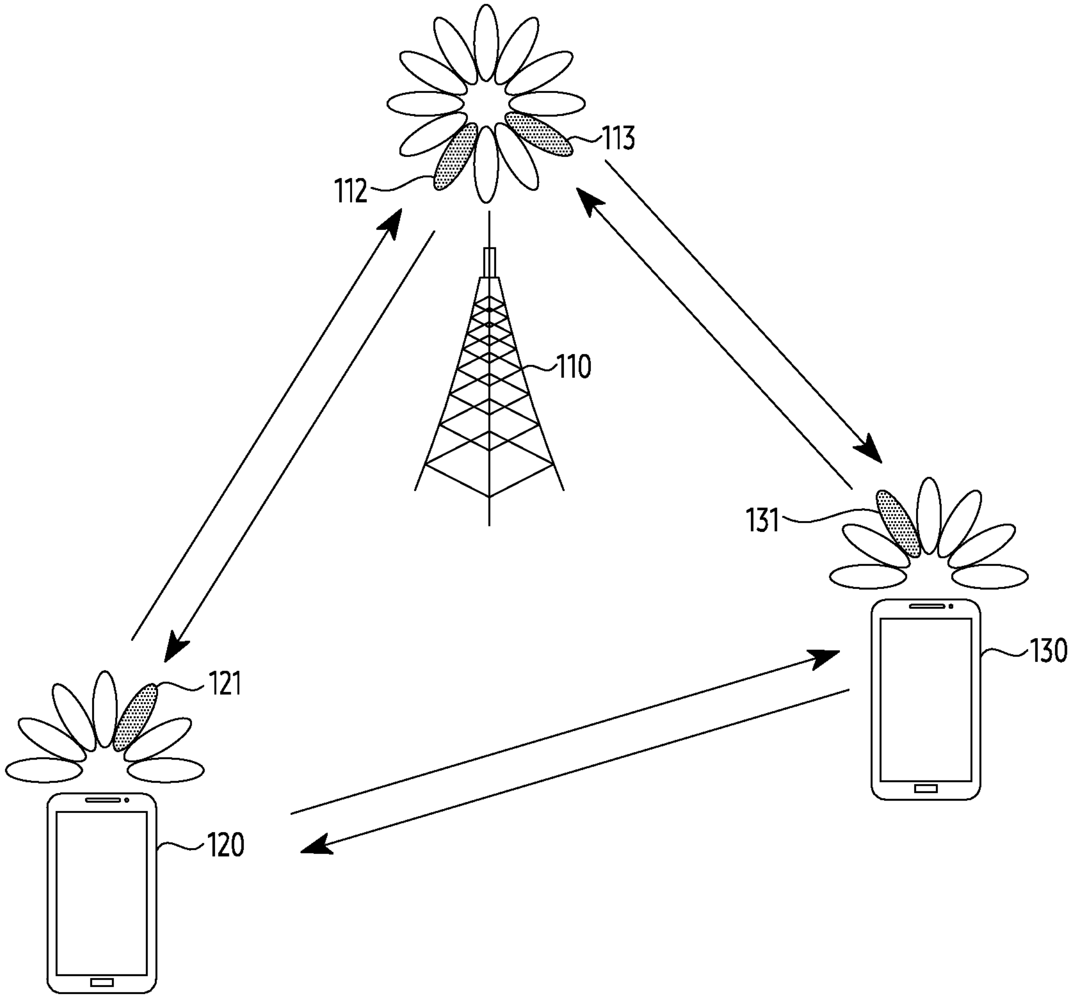
FIG. 1 illustrates a wireless communication system according to embodiments.

Terms used in the present disclosure are used only to describe a specific embodiment and may not be intended to limit the scope of another embodiment. A singular expression may include a plural expression unless it is clearly meant differently in the context. The terms used herein, including a technical or scientific term, may have the same meaning as generally understood by a person having ordinary knowledge in the technical field described in the present disclosure. Terms defined in a general dictionary among the terms used in the present disclosure may be interpreted with the same and/or a substantially similar meaning as a contextual meaning of related technology, and unless clearly defined in the present disclosure, it may not be interpreted in an ideal and/or excessively formal meaning. In some cases, even terms defined in the present disclosure may not be interpreted to exclude embodiments of the present disclosure.

With regard to the drawings, similar reference numerals may be used to refer to similar or related elements.

As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wired), wirelessly, or via a third element.

In various embodiments of the present disclosure, a hardware approach may be described as an example. However, since various embodiments of the present disclosure may include technology that may use a combination of hardware and/or software, the various embodiments of the present disclosure may not exclude a software-based approach.

A term referring to a component of the device (e.g., switch, line, transmission line, feeding line, power amplifier, network, combiner, coupler, and the like), a term referring to one configuration of a component of a device (e.g., port, terminal, end, input end, output end, node), and the like used in the following description may be illustrated for convenience of description. Accordingly, the present disclosure may not be limited to terms described below, and another term having an equivalent technical meaning may be used. Alternatively or additionally, a term such as ‘ . . . part’, ‘ . . . er’, ‘ . . . material’, ‘ . . . body’, and the like used herein may refer to at least one shape structure, and/or may refer to a unit that processes a function.

It is to be understood that in order to determine whether a specific condition is satisfied and/or fulfilled, an expression having more conditions and/or parameters and/or having less conditions and/or parameters may be used. That is, the expression may be only a description for expressing an example and may not exclude a description of more than or equal to or less than or equal to. A condition described as ‘more than or equal to’ may be replaced with ‘ more than’, a condition described as ‘less than or equal to’ may be replaced with ‘less than’, and a condition described as ‘more than or equal to and less than’ may be replaced with ‘more than and less than or equal to’.

Reference throughout the present disclosure to “one embodiment,” “an embodiment,” “an example embodiment,” or similar language may indicate that a particular feature, structure, or characteristic described in connection with the indicated embodiment is included in at least one embodiment of the present solution. Thus, the phrases “in one embodiment”, “in an embodiment,” “in an example embodiment,” and similar language throughout this disclosure may, but do not necessarily, all refer to the same embodiment.

Hereinafter, various embodiments of the present disclosure are described with reference to the accompanying drawings.

FIG. 1 illustrates a wireless communication system according to embodiments.

FIG. 1 illustrates the wireless communication system according to various embodiments of the present disclosure. FIG. 1 illustrates a base station 110, a terminal 120, and a terminal 130 as a part of nodes that use a wireless channel in the wireless communication system. FIG. 1A illustrates only one base station, but another base station the same with to or similar to the base station 110 may be further included.

The base station 110 is a network infrastructure that provides wireless access to the terminals 120 and 130. The base station 110 has coverage defined as a certain geographic area based on a distance capable of transmitting a signal. The base station 110 may be referred to as an ‘access point (AP)’, an ‘eNodeB (eNB)’, a ‘5th generation node (5G node)’, ‘wireless point’, ‘transmission/reception point (TRP)’ or another term having an equivalent technical meaning, in addition to the base station.

Each of the terminal 120 and the terminal 130 is a device used by a user and communicates with the base station 110 through the wireless channel. In some cases, at least one of the terminal 120 and the terminal 130 may be operated without user involvement. In other words, the at least one of the terminal 120 and the terminal 130 is a device that performs machine type communication (MTC) and may not be carried by the user. Each of the terminal 120 and the terminal 130 may be referred to as a ‘user equipment (UE)’, a ‘mobile station’, a ‘subscriber station’, ‘customer premises equipment (CPE)’, ‘remote terminal’, a ‘wireless terminal’, ‘electronic device’, or ‘user device’ or another term having an equivalent technical meaning, in addition to a terminal.

The base station 110, the terminal 120, and the terminal 130 may transmit and receive a wireless signal in a mmWave band (e.g., 28 GHz, 30 GHz, 38 GHz, and 60 GHz). At this time, in order to improve the channel gain, the base station 110, the terminal 120, and the terminal 130 may perform beamforming. Here, the beamforming may include transmission beamforming and reception beamforming. In other words, the base station 110, the terminal 120, and the terminal 130 may assign directivity to a transmission signal or a reception signal. To this end, the base station 110 and the terminals 120 and 130 may select serving beams 112, 113, 121 and 131 through a beam search or beam management procedure. After the serving beams 112, 113, 121, and 131 are selected, subsequent communication may be performed through a resource having a quasi co-located (QCL) relationship with a resource that transmitted the serving beams 112, 113, 121, and 131.

The base station 110 or the terminals 120 and 130 may include an antenna array. Each antenna included in the antenna array may be referred to as an array element or an antenna element. Hereinafter, in the present disclosure, the antenna array is illustrated as a two-dimensional planar array, but this is only an embodiment and does not limit other embodiments of the present disclosure. The antenna array may be configured in various forms such as a linear array or a multilayer array and the like. The antenna array may be referred to as a massive antenna array. In addition, the antenna array may include a plurality of sub arrays including a plurality of antenna elements.

In an embodiment, the base station 110 may include a power amplifier (not shown) configured to amplify and transmit a signal (e.g., a radio frequency (RF) signal) or process the amplified signal after receiving the amplified signal. The power source (and/or power) supplied to the drain of the power amplifier may require a power (e.g., a current, a voltage) with a minimized ripple in order to meet design constraints for linearity of an output signal. Alternatively or additionally, in the RF system, characteristics of the signal inputted or outputted may be changed according to temperature. Thus, the power amplifier may need to be calibrated to ensure linearity, and input of the power with minimized ripple may be required for accurate calibration In an embodiment, the voltage applied to the drain of the power amplifier may be stepped-up and/or stepped-down based on the power amplifier output. Consequently, for voltage variability, a buck-boost converter may be used in connection with the power amplifier, for example. In an embodiment, a pulse width modulation (PWM) integrated circuit (IC) may include a gate driver for driving a transistor (e.g., a field effect transistor (FET)) of the converter. Alternatively or additionally, when the buck-boost converter is operating in a boost mode or a buck mode, at least some of the transistors of the buck-boost converter may be in an on (e.g., active) state and/or other transistors of the buck-boost converter may be in an off (e.g., inactive) state. In such an example, when the boost mode or the buck mode is maintained for a certain period of time or more (e.g., greater than a threshold), charging for supplying source power of the gate driver may be required in order to control the operation of a switch. That is, in order for some FETs of the boost end to operate continuously in the on state in the buck mode, other FETs of the boost end may need to be intermittently (and/or periodically) switched from the off state to the on state. As a result, the source power of the gate driver may be recharged by turning another FET from the off state to the on state. However, ripple power may be generated as the FET (e.g., the other FET) that should be maintained in the off state, may be temporarily operated in the on state. A buck-boost converter having a structure that may be capable of reducing generation of ripple is described with reference to FIGS. 2 to 5.

Figure 2:
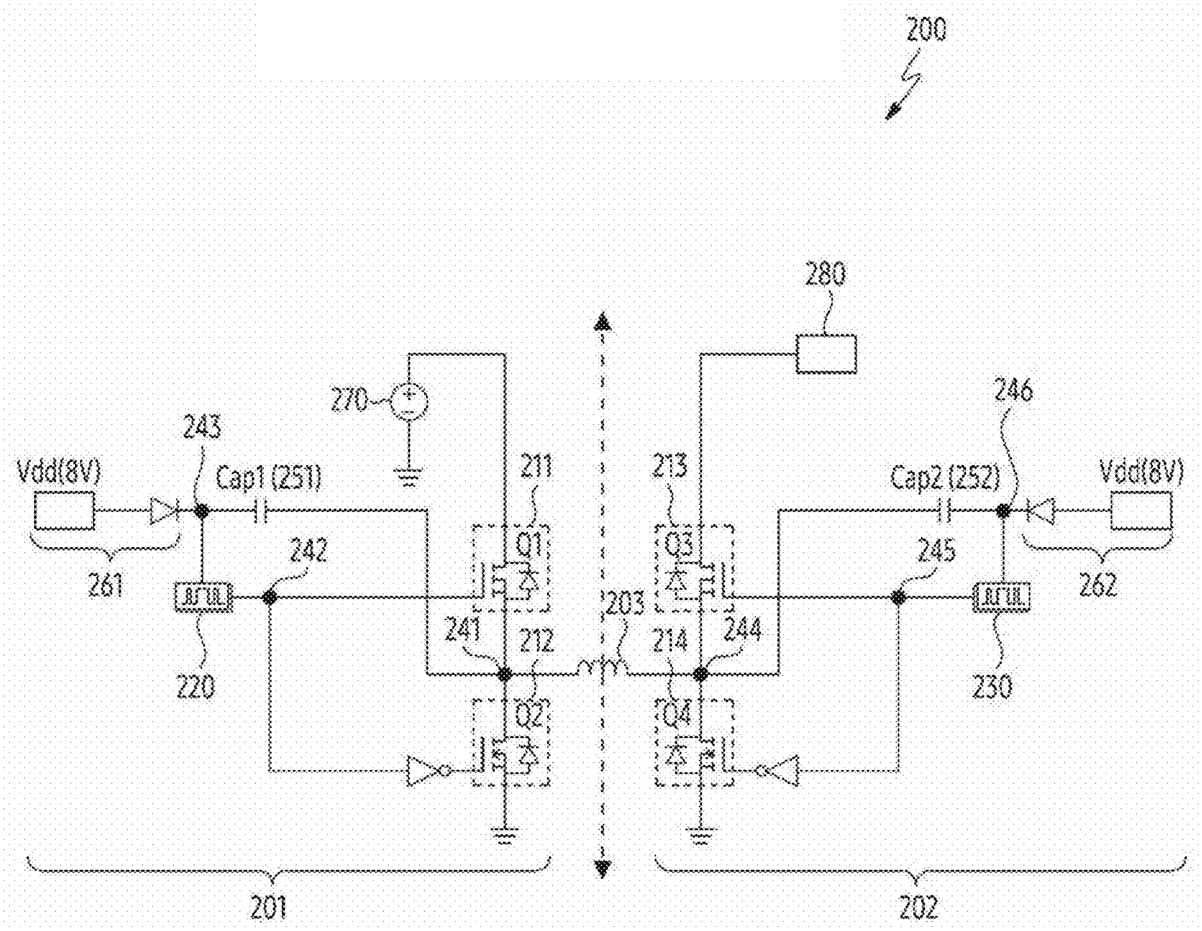
FIG. 2 (RELATED ART)
FIG. 2 illustrates an example of a buck-boost converter for describing embodiments.

FIG. 2 illustrates an example of a buck-boost converter for describing embodiments. Herein, the buck may refer to the stepping down of the voltage, and the boost may refer to the stepping up of the voltage.

Referring to FIG. 2, a converter 200 may include a first circuit 201 (e.g., a buck circuit) configured to perform a buck operation and a second circuit 202 (e.g., a boost circuit) configured to perform a boost operation. The converter 200 may include an inductor 203 connecting the first circuit 201 and the second circuit 202. For example, the inductor 203 may be disposed between the first circuit 201 and the second circuit 202.

The converter 200 may include a plurality of transistors 211, 212, 213, and 214. For example, the transistor may include a field effect transistor (FET). The plurality of transistors 211 to 214 may be disposed in the first circuit 201 and/or the second circuit 202. For example, the first circuit 201 may include the first transistor 211 and the second transistor 212, and the second circuit 202 may include the third transistor 213 and the fourth transistor 214. In an embodiment, the plurality of transistors 211 to 214 may control the flow of current through switching, and thus, may be referred to as switches. Each of the plurality of transistors 211 to 214 may include a parasitic diode and/or an internal diode.

The converter 200 may include driver circuits 220 and 230 (or a drive circuit) for driving transistors. For example, the converter 200 may include the first drive circuit 220 for driving the first transistor 211 and the second transistor 212 of the first circuit 201. The converter 200 may include the second drive circuit 230 for driving the third transistor 213 and the fourth transistor 214 of the second circuit 202.

The converter 200 may include capacitors 251 and 252 for maintaining voltages of the driver circuits. For example, the converter 200 may include the first capacitor 251 for maintaining a voltage of the first drive circuit 220. The converter 200 may include the second capacitor 252 for maintaining a voltage of the second drive circuit 230.

The converter 200 may include bias structures 261 and 262 for applying a driving voltage of the driver circuit. For example, the converter 200 may include the first bias structure 261, and the first bias structure 261 may include a bias power Vdd and a diode. In addition, the converter 200 may include the second bias structure 262, and the second bias structure 262 may include the bias power Vdd and the diode. As shown in FIG. 2 illustrates a case where the bias power (Vdd) is a voltage source of 8V, but this is only an example. However, the present disclosure is not limited in this regard, and the bias power Vdd may be voltage sources having other voltage levels. Here, the diode of the first bias structure 261 may be configured to prevent the flow of current applied from the bias power Vdd to the first capacitor 251 and/or the first drive circuit 220. The diode of the second bias structure 262 may be configured to prevent the reverse flow of current applied to the second capacitor 252 and/or the second drive circuit 230.

The converter 200 may be connected (e.g., coupled) to an input power 270 through a drain of the first transistor 211. In addition, the converter 200 may be connected to a power amplifier 280 through a drain of the third transistor 213. For example, the power amplifier 280 may refer to a drain of the power amplifier 280.

Referring to the first circuit 201, the first transistor 211 may be connected to the input power 270, the second transistor 212, the first drive circuit 220, the inductor 203, and the first capacitor 251. For example, the drain of the first transistor 211 may be connected to the input power 270. A gate of the first transistor 211 may be connected to the first drive circuit 220 through a second node 242. A source of the first transistor 211 may be connected to the drain of the inductor 203 and the second transistor 212 through a first node 241. In addition, the source of the first transistor 211 may be connected to the first capacitor 251 through the first node 241. The second transistor 212 may be connected to the first transistor 211, the inductor 203, the first drive circuit 220, the ground GND, and the first capacitor 251. For example, a drain of the second transistor 212 may be connected to the source of the first transistor 211, the inductor 203, and the first capacitor 251 through the first node 241. A gate of the second transistor 212 may be connected to the first drive circuit 220. In this case, the gate of the second transistor 212 may be connected to an inverter, and may be connected to the first drive circuit 220 through the inverter and the second node 242. A source of the second transistor 212 may be connected to the ground.

Alternatively or additionally, the first drive circuit 220 may be connected to the first transistor 211, the second transistor 212, the first capacitor 251, and the first bias structure 261. For example, the first drive circuit 220 may be connected to the gate of the first transistor 211 and the gate of the second transistor 212 through the second node 242. The first drive circuit 220 may be connected to the first capacitor 251 and the diode of the first bias structure 261 through a third node 243. The first capacitor 251 may be connected to the first transistor 211, the second transistor 212, the inductor 203, the first bias structure 261, and the first drive circuit 220. For example, the first capacitor 251 may be connected to the source of the first transistor 211, the inductor 203, and the drain of the second transistor 212 through the second node 242. The first capacitor 251 may be connected to the first drive circuit 220 and the diode of the first bias structure 261 through the third node 243.

Referring to the second circuit 202, the third transistor 213 may be connected to the power amplifier 280, the fourth transistor 214, the second drive circuit 230, the inductor 203, and the second capacitor 252. For example, the drain of the third transistor 213 may be connected to the drain of the power amplifier 280. A gate of the third transistor 213 may be connected to the second drive circuit 230 through a fifth node 245. A source of the third transistor 213 may be connected to the inductor 203 and a drain of the fourth transistor 214 through a fourth node 244. In addition, the source of the third transistor 213 may be connected to the second capacitor 252 through the fourth node 244. The fourth transistor 214 may be connected to the third transistor 213, the inductor 203, the second drive circuit 230, the ground GND, and the second capacitor 252. For example, the drain of the fourth transistor 214 may be connected to the source of the third transistor 213, the inductor 203, and the second capacitor 252 through the fourth node 244. A gate of the fourth transistor 214 may be connected to the second drive circuit 230. In such an embodiment, the gate of the fourth transistor 214 may be connected to the inverter, and may be connected to the second drive circuit 230 through the inverter and the fifth node 245. A source of the fourth transistor 214 may be connected to the ground.

Alternatively or additionally, the second drive circuit 230 may be connected to the third transistor 213, the fourth transistor 214, the second capacitor 252, and the second bias structure 262. For example, the second drive circuit 230 may be connected to the gate of the third transistor 213 and the gate of the fourth transistor 214 through the fifth node 245. The second drive circuit 230 may be connected to the second capacitor 252 and the diode of the second bias structure 262 through a sixth node 246. The second capacitor 252 may be connected to the third transistor 213, the fourth transistor 214, the inductor 203, the second bias structure 262, and the second drive circuit 230. For example, the second capacitor 252 may be connected to the source of the third transistor 213, the inductor 203, and the drain of the fourth transistor 214 through the fifth node 245. The second capacitor 252 may be connected to the second drive circuit 230 and the diode of the second bias structure 262 through the sixth node 246.

The converter 200 may transmit the output voltage to the power amplifier 280 by stepping-down and/or stepping-up the inputted voltage. For example, in a case that the converter 200 operates in the buck mode, the converter 200 may transmit an output voltage lower than the inputted voltage to the power amplifier 280. Alternatively or additionally, in a case that the converter 200 operates in the boost mode, the converter 200 may transmit an output voltage higher than the inputted voltage to the power amplifier 280.

Continuing to refer to FIG. 2, in a case of the converter 200 operating in the buck mode, the first transistor 211 and the second transistor 212 of the first circuit 201 of the converter 200 may operate complementarily. For example, when the first transistor 211 is in the on state, the second transistor 212 may be in the off state. Alternatively or additionally, when the first transistor 211 is in the off state, the second transistor 212 may be in the on state. By the complementary operation of the first transistor 211 and the second transistor 212, the first circuit 201 may transmit the step-down converted input voltage to the second circuit 202. However, in order to transmit the step-down converted input voltage to the power amplifier 280, the third transistor 213 of the second circuit 202 may need to be maintained in the on state and the fourth transistor 214 may need to be maintained in the off state. The third transistor 213 may be maintained in the on state using a stored voltage of the second capacitor 252. However, the second capacitor 252 may be discharged according to a limit of the capacity. For example, the second capacitor 252 may be discharged from the voltage +Vdd of the fourth node 244 to the voltage of the fourth node 244. The second drive circuit 230 may detect the voltage of the second capacitor 252 and may intermittently (and/or periodically) switch the fourth transistor 214 to the on state. Thus, the converter 200 may momentarily operate in the boost mode for charging the capacitor while operating in the buck mode.

As described above, while the converter 200 operates in the buck mode, the third transistor 213 of the second circuit 202 may need to be maintained in the on state. However, due to the limit of the capacity of the second capacitor 252, the turn-on voltage of the gate of the third transistor 213 may be discharged (e.g., may become zero volts (0V)) and the third transistor 213 may be in the off state. For example, the third transistor 213 may transmit the output current to the power amplifier 280 only through the internal diode. In such an example, assuming that the voltage applied to the internal diode is $V_f$ and that the current of the internal diode is $I_{out}$, a power loss of as much as $V_f \times I_{out}$ may occur. In order to prevent unnecessary power loss, the second capacitor 252 may need to be charged intermittently (and/or periodically), and the second drive circuit 230 may momentarily switch the fourth transistor 214 from the off state to the on state. Accordingly, the converter 200 for the buck mode may be momentarily operated in the boost mode, and an unwanted ripple voltage may be outputted. As a result, the power amplifier 280 connected to the output end of the converter 200 may fail in calibration and/or may not maintain linearity. Hereinafter, in the present disclosure, a structure of a converter for minimizing generation of a ripple voltage through a minimum structure change is disclosed.

Although FIG. 2 describes a converter operating in the buck mode as an example, the present disclosure is not limited in this regard. For example, a substantially similar description may be applied to a converter operating in the boost mode. Hereinafter, for convenience of description, the converter operating in the buck mode is to be described as an example, but the present disclosure may include a converter operating in the boost mode, and/or a converter capable of operating in the buck mode and the boost mode.

Figure 3:
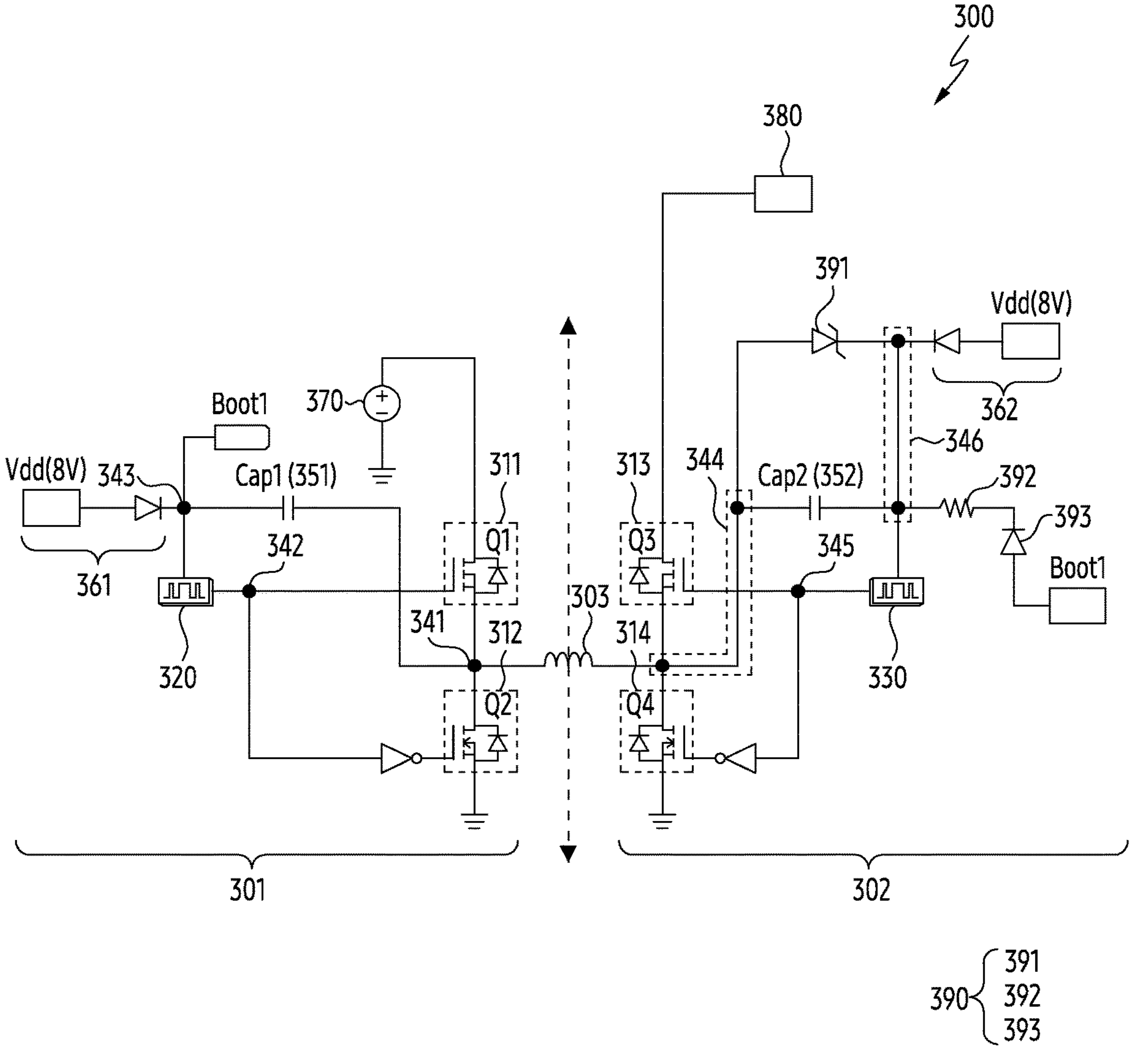
FIG. 3 illustrates an example of a buck-boost converter according to embodiments.

FIG. 3 illustrates an example of a buck-boost converter according to embodiments. The buck-boost converter of FIG. 3 may be an example of a converter operating in a buck mode. In an embodiment, the buck may refer to the stepping down of the voltage, and/or the boost may refer to the stepping up of the voltage.

Referring to FIG. 3, according to an embodiment, a converter 300 may include a first circuit 301 (e.g., a buck circuit) configured to perform a buck operation, a second circuit 302 (e.g., a boost circuit) configured to perform a boost operation, and a third circuit 390 configured to charge a capacitor. In an embodiment, the converter 300 may include an inductor 303 connecting the first circuit 301 and the second circuit 302. The inductor 303 may be disposed between the first circuit 301 and the second circuit 302.

According to an embodiment, the converter 300 may include a plurality of transistors 311, 312, 313, and 314. For example, the transistor may include a field effect transistor (FET). The plurality of transistors 311 to 314 may be disposed in the first circuit 301 and/or the second circuit 302. For example, the first circuit 301 may include the first transistor 311 and the second transistor 312, and the second circuit 302 may include the third transistor 313 and the fourth transistor 314. The plurality of transistors 311 to 314 may control the flow of current through switching and thus, may be referred to as switches. Each of the plurality of transistors 311 to 314 may include a parasitic diode and/or an internal diode.

According to an embodiment, the converter 300 may include driver circuits 320 and 330 (or a drive circuit) for driving transistors. For example, the converter 300 may include a first drive circuit 320 for driving the first transistor 311 and the second transistor 312 of the first circuit 301. For example, the converter 300 may include the first drive circuit 320 for driving the first transistor 311 and the second transistor 312 of the first circuit 301. In addition, the converter 300 may include a second drive circuit 330 for driving the third transistor 313 and the fourth transistor 314 of the second circuit 302.

According to an embodiment, the converter 300 may include capacitors 351 and 352 for maintaining voltages of driver circuits. For example, the converter 300 may include a first capacitor 351 for maintaining the voltage of the first drive circuit 320. The converter 300 may include a second capacitor 352 for maintaining the voltage of the second drive circuit 330.

According to an embodiment, the converter 300 may include bias structures 361 and 362 for applying a driving voltage of the driver circuit. For example, the converter 300 may include a first bias structure 361, and the first bias structure 361 may include a bias power Vdd and a diode. In addition, the converter 300 may include a second bias structure 362, and the second bias structure 362 may include the bias power Vdd and the diode. As shown in FIG. 3, the bias power (Vdd) is a voltage source of 8V, but this is only an example. However, the present disclosure is not limited in this regard, and the bias power Vdd may be and/or may include voltage sources having other voltage levels. In an embodiment, a diode of the first bias structure 361 may be configured to prevent the flow of current applied from the bias power Vdd to the first capacitor 351 and/or the first drive circuit 320. A diode of the second bias structure 362 may be configured to prevent the reverse flow of current applied to the second capacitor 352 and/or the second drive circuit 330.

According to an embodiment, the converter 300 may be connected (e.g., coupled) to an input power 370 through a drain of the first transistor 311. In addition, the converter 300 may be connected to a power amplifier 380 through a drain of the third transistor 313. For example, the power amplifier 380 may refer to a drain of the power amplifier 380.

According to an embodiment, the converter 300 may include the third circuit 390 for charging the second capacitor 352. The third circuit 390 may include a Zener diode 391, a resistor 392, and a diode 393. Here, the Zener diode 391 may be and/or may include an element used to maintain a constant voltage even when a change in current occurs. That is, the Zener diode 391 may be used in a reverse direction unlike a general diode. The resistor 392 may be an element used for removing noise and for impedance matching. The resistor 392 may be connected in series to a signal line with a high frequency and may be referred to as a damping resistor. The diode 393 may be and/or may include an element for preventing reverse flow of current flowing from the first circuit 301 to the second circuit 302. Here, the diode 393 may be referred to as a block diode and/or a blocking diode.

Referring to the first circuit 301, according to an embodiment, the first transistor 311 may be connected to the input power 370, the second transistor 312, the first drive circuit 320, the inductor 303, and the first capacitor 351. For example, the drain of the first transistor 311 may be connected to the input power 370. A gate of the first transistor 311 may be connected to the first drive circuit 320 through a second node 342. A source of the first transistor 311 may be connected to the inductor 303 and a drain of the second transistor 312 through a first node 341. In addition, the source of the first transistor 311 may be connected to the first capacitor 351 through the first node 341. In an embodiment, the second transistor 312 may be connected to the first transistor 311, the inductor 303, the first drive circuit 320, a ground GND, and the first capacitor 351. For example, the drain of the second transistor 312 may be connected to the source of the first transistor 311, the inductor 303, and the first capacitor 351 through the first node 341. A gate of the second transistor 312 may be connected to the first drive circuit 320. In this case, the gate of the second transistor 312 may be connected to the inverter, and may be connected to the first drive circuit 320 through the inverter and the second node 342. A source of the second transistor 312 may be connected to the ground.

According to an embodiment, the first drive circuit 320 may be connected to the first transistor 311, the second transistor 312, the first capacitor 351, the first bias structure 361, and the third circuit 390. For example, the first drive circuit 320 may be connected to the gate of the first transistor 311 and the gate of the second transistor 312 through the second node 342. The first drive circuit 320 may be connected to the first capacitor 351 and the diode of the first bias structure 361 through a third node 343. In addition, the first drive circuit 320 may be connected to the block diode 393 through the third node 343.

According to an embodiment, the first capacitor 351 may be connected to the first transistor 311, the second transistor 312, the inductor 303, the first bias structure 361, the first drive circuit 320, and the third circuit 390. For example, the first capacitor 351 may be connected to the source of the first transistor 311, the inductor 303, and the drain of the second transistor 312 through the second node 342. The first capacitor 351 may be connected to the first drive circuit 320, the diode of the first bias structure 361, and the block diode 393 through the third node 343.

Referring to the second circuit 302, the third transistor 313 may be connected to the power amplifier 380, the fourth transistor 314, the second drive circuit 330, the inductor 303, the second capacitor 352, and the third circuit 390. For example, the drain of the third transistor 313 may be connected to the drain of the power amplifier 380. A gate of the third transistor 313 may be connected to the second drive circuit 330 through a fifth node 345. A source of the third transistor 313 may be connected to the inductor 303 and a drain of the fourth transistor 314 through a fourth node 344. In addition, the source of the third transistor 313 may be connected to the second capacitor 352 and the Zener diode 391 through the fourth node 344. In an embodiment, the fourth transistor 314 may be connected to the third transistor 313, the inductor 303, the second drive circuit 330, the ground GND, the second capacitor 352, and the third circuit 390. For example, the drain of the fourth transistor 314 may be connected to the source of the third transistor 313, the inductor 303, and the second capacitor 352 through the fourth node 344. The drain of the fourth transistor 314 may be connected to the Zener diode 391 through the fourth node 344. A gate of the fourth transistor 314 may be connected to the second drive circuit 330. In this case, the gate of the fourth transistor 314 may be connected to the inverter, and may be connected to the second drive circuit 330 through the inverter and the fifth node 345. A source of the fourth transistor 314 may be connected to the ground.

According to an embodiment, the second drive circuit 330 may be connected to the third transistor 313, the fourth transistor 314, the second capacitor 352, the second bias structure 362, and the third circuit 390. For example, the second drive circuit 330 may be connected to the gate of the third transistor 313 and the gate of the fourth transistor 314 through the fifth node 345. The second drive circuit 330 may be connected to the second capacitor 352 and the diode of the second bias structure 362 through a sixth node 346. The second drive circuit 330 may be connected to the Zener diode 391 and the damping resistor 392 through the sixth node 346.

According to an embodiment, the second capacitor 352 may be connected to the third transistor 313, the fourth transistor 314, the inductor 303, the second bias structure 362, the second drive circuit 330, the Zener diode 391, and the damping resistor 392. For example, the second capacitor 352 may be connected to the source of the third transistor 313, the inductor 303, and the drain of the fourth transistor 314 through the fifth node 345. The second capacitor 352 may be connected to the second drive circuit 330 and the diode of the second bias structure 362 through the sixth node 346. The second capacitor 352 may be connected to the Zener diode 391 and the damping resistor 392 through the sixth node 346. In such an embodiment, the second capacitor 352 may be connected in parallel with the Zener diode 391. That is, the second capacitor 352 may be connected to the first circuit 301 through the third circuit 390, and current may be applied to the second capacitor 352 from the first circuit 301.

According to an embodiment, the third circuit 390 may connect the first circuit 301 and the second circuit 302. For example, the damping resistor 392 and the block diode 393 of the third circuit 390 may be connected in series between the sixth node 346 and the third node 343. The first circuit 301 and the second circuit 302 may be connected to each other by the damping resistor 392 and the block diode 393. According to an embodiment, the Zener diode 391 may be connected in parallel to the second capacitor 352.

According to an embodiment, the converter 300 may transmit the output voltage to the power amplifier 380 by stepping down and/or stepping up the inputted voltage. For example, in a case that the converter 300 operates in the buck mode, the converter 300 may transmit an output voltage lower than the inputted voltage to the power amplifier 380. Alternatively or additionally, in a case that the converter 300 operates in the boost mode, the converter 300 may deliver an output voltage higher than the inputted voltage to the power amplifier 380.

Continuing to refer to FIG. 3, in a case of the converter 300 operating in the buck mode, the first transistor 311 and the second transistor 312 of the first circuit 301 of the converter 300 may operate complementarily. For example, when the first transistor 311 is in the on state, the second transistor 312 may be in the off state. Alternatively or additionally, when the first transistor 311 is in the off state, the second transistor 312 may be in the on state. By the complementary operation of the first transistor 311 and the second transistor 312, the first circuit 301 may transmit the step-down converted input voltage to the second circuit 302. However, in order to transmit the step-down converted input voltage to the power amplifier 380, the third transistor 313 of the second circuit 302 may need to be maintained in the on state and the fourth transistor 314 may need to be maintained in the off state. In an embodiment, the third transistor 313 may be maintained in the on state using a stored voltage of the second capacitor 352. The second capacitor 352 may be discharged and charged. For example, the second capacitor 352 may be discharged to a value between the voltage +Vdd of the fourth node 344 and the voltage of the fourth node 344. Alternatively or additionally, the second capacitor 352 may be charged by the current introduced from the first circuit 301 through the damping resistor 392 and the block diode 393 of the third circuit 390. That is, in a case that the converter 300 operates in the buck mode, the third circuit 390 may draw current generated by complementary operating transistors (e.g., the first transistor 311 and the second transistor 312) from the first circuit 301 to the second circuit 302.

According to the above, the converter 300 to which the third circuit 390 connecting the first circuit 301 and the second circuit 302 is added may be charged without completely discharging the second capacitor 352 even in case of operating in the buck mode. Accordingly, the third transistor 313 may be continuously maintained in the on state while the converter 300 is operating in the buck mode. While the converter 300 operates in the buck mode, since the third transistor 313 is maintained in the on state, unnecessary ripple voltage may not be generated in the converter 300. That is, the converter 300 may step-down the inputted signal and transmit the same to the power amplifier 380 in a stable state. Thus, the power amplifier 380 may be driven by receiving a stable signal, and calibration of the power amplifier 380 may be minimized. In addition, the converter 300 may reduce an unnecessary ripple voltage through the third circuit 390 configured with a simple structure.

Figure 4:
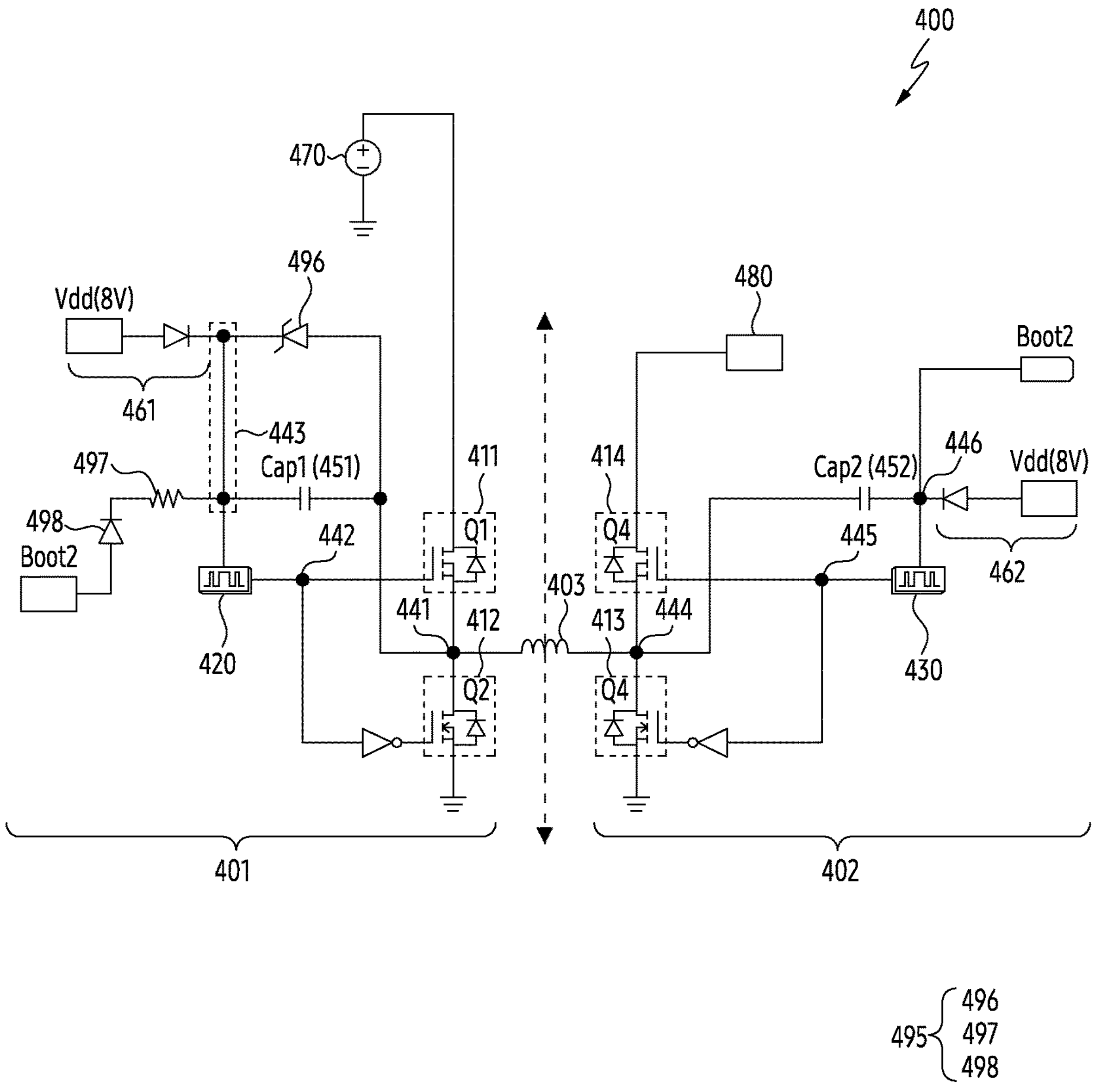
FIG. 4 illustrates an example of a buck-boost converter according to embodiments.

FIG. 4 illustrates an example of a buck-boost converter according to embodiments. The buck-boost converter of FIG. 4 may be an example of a converter operating in a boost mode. In an embodiment, the buck may refer to the stepping down of the voltage, and the boost may refer to the stepping up of the voltage.

Referring to FIG. 4, according to an embodiment, a converter 400 may include a first circuit 401 (e.g., a buck circuit) configured to perform a buck operation, a second circuit 402 (e.g., a boost circuit) configured to perform a boost operation, and a fourth circuit 495 configured to charge a capacitor. In an embodiment, the converter 400 may further include an inductor 403 connecting the first circuit 401 and the second circuit 402, and the inductor 403 may be disposed between the first circuit 401 and the second circuit 402.

According to an embodiment, the converter 400 may include a plurality of transistors 411, 412, 413, and 414. For example, the transistor may include a field effect transistor (FET). The plurality of transistors 411 to 414 may be disposed in the first circuit 401 and/or the second circuit 402. For example, the first circuit 401 may include the first transistor 411 and the second transistor 412, and the second circuit 402 may include the third transistor 413 and the fourth transistor 414. The plurality of transistors 411 to 414 may control the flow of current through switching, and thus, may be referred to as switches. Each of the plurality of transistors 411 to 414 may include a parasitic diode and/or an internal diode.

According to an embodiment, the converter 400 may include driver circuits 420 and 430 (or a drive circuit) for driving transistors. For example, the converter 400 may include a first drive circuit 420 for driving the first transistor 411 and the second transistor 412 of the first circuit 401. In addition, the converter 400 may include a second drive circuit 430 for driving the third transistor 413 and the fourth transistor 414 of the second circuit 402.

According to an embodiment, the converter 400 may include capacitors 451 and 452 for maintaining voltages of driver circuits. For example, the converter 400 may include a first capacitor 451 for maintaining a voltage of the first drive circuit 420. The converter 400 may include a second capacitor 452 for maintaining a voltage of the second drive circuit 430.

According to an embodiment, the converter 400 may include bias structures 461 and 462 for applying a driving voltage of the driver circuit. For example, the converter 400 may include a first bias structure 461, and the first bias structure 461 may include a bias power Vdd and a diode. In addition, the converter 400 may include a second bias structure 462, and the second bias structure 462 may include the bias power Vdd and the diode. As shown in FIG. 4, the bias power Vdd may be and/or may include a voltage source of 8V, for example. However, the present disclosure is not limited in this regard, and the bias power Vdd may be and/or may include voltage sources having other voltage levels. In an embodiment, a diode of the first bias structure 461 may be configured to prevent the flow of current applied from the bias power Vdd to the first capacitor 451 and/or the first drive circuit 420. A diode of the second bias structure 462 may be configured to prevent the reverse flow of current applied to the second capacitor 452 and/or a second drive circuit 430.

According to an embodiment, the converter 400 may be connected (e.g., coupled) to an input power 470 through a drain of the first transistor 411. In addutuib, the converter 400 may be connected to the power amplifier 480 through a drain of the third transistor 413. For example, the power amplifier 480 may refer to a drain of the power amplifier 480.

According to an embodiment, the converter 400 may include the fourth circuit 495 for charging the first capacitor 451. The fourth circuit 495 may include a Zener diode 496, a resistor 497, and a diode 498. Here, the Zener diode 496 may be an element used to maintain a constant voltage even when a change in current occurs. That is, the Zener diode 496 may be used in a reverse direction unlike a general diode. The resistor 497 may be an element used for removing noise and for impedance matching. The resistor 497 may be connected in series to a signal line with a high frequency and may be referred to as a damping resistor. The diode 498 may be an element for preventing reverse flow of current flowing from the second circuit 402 to the first circuit 401. Here, the diode 498 may be referred to as a block diode and/or a blocking diode.

Referring to the first circuit 401, according to an embodiment, the first transistor 411 may be connected to the input power 470, the second transistor 412, the first drive circuit 420, the inductor 403, the first capacitor 451, and the fourth circuit 495. For example, the drain of the first transistor 411 may be connected to the input power 470. A gate of the first transistor 411 may be connected to the first drive circuit 420 through a second node 442. A source of the first transistor 411 may be connected to the inductor 403 and a drain of the second transistor 412 through a first node 441. In addition, the source of the first transistor 411 may be connected to the first capacitor 451 and the Zener diode 496 through the first node 441. The second transistor 412 may be connected to the first transistor 411, the inductor 403, the first drive circuit 420, a ground GND, the first capacitor 451, and the fourth circuit 495. For example, the drain of the second transistor 412 may be connected to the source of the first transistor 411, the inductor 403, and the first capacitor 451 through the first node 441. The drain of the second transistor 412 may be connected to the Zener diode 496 through the first node 441. A gate of the second transistor 412 may be connected to the first drive circuit 420. In this case, the gate of the second transistor 412 may be connected to the inverter, and/or may be connected to the first drive circuit 420 through the inverter and the second node 442. A source of the second transistor 412 may be connected to the ground.

According to an embodiment, the first drive circuit 420 may be connected to the first transistor 411, the second transistor 412, the first capacitor 451, the first bias structure 461, and the fourth circuit 495. For example, the first drive circuit 420 may be connected to the gate of the first transistor 411 and the gate of the second transistor 412 through the second node 442. The first drive circuit 420 may be connected to the first capacitor 451 and the diode of the first bias structure 461 through a third node 443. In addition, the first drive circuit 420 may be connected to the Zener diode 496 and the damping resistor 497 through the third node 443.

According to an embodiment, the first capacitor 451 may be connected to the first transistor 411, the second transistor 412, the inductor 403, the first bias structure 461, the first drive circuit 420, and the fourth circuit 495. For example, the first capacitor 451 may be connected to the source of the first transistor 411, the inductor 403, and the drain of the second transistor 412 through the second node 442. The first capacitor 451 may be connected to the first drive circuit 420 and the diode of the first bias structure 461 through the third node 443. The first capacitor 451 may be connected to the Zener diode 496 and the damping resistor 497 through the third node 443. In such an embodiment, the first capacitor 451 may be connected in parallel with the Zener diode 496. That is, the first capacitor 451 may be connected to the second circuit 402 through the fourth circuit 495, and current may be applied to the first capacitor 451 from the second circuit 402.

Referring to the second circuit 402, the third transistor 413 may be connected to the power amplifier 480, the fourth transistor 414, the second drive circuit 430, the inductor 403, and the second capacitor 452. For example, the drain of the third transistor 413 may be connected to the drain of the power amplifier 480. A gate of the third transistor 413 may be connected to the second drive circuit 430 through a fifth node 445. A source of the third transistor 413 may be connected to the inductor 403 and a drain of the fourth transistor 414 through a fourth node 444. In addition, the source of the third transistor 413 may be connected to the second capacitor 452 through the fourth node 444. In an embodiment, the fourth transistor 414 may be connected to the third transistor 413, the inductor 403, the second drive circuit 430, the ground GND, and the second capacitor 452. For example, the drain of the fourth transistor 414 may be connected to the source of the third transistor 413, the inductor 403, and the second capacitor 452 through the fourth node 444. A gate of the fourth transistor 414 may be connected to the second drive circuit 430. In such an embodiment, the gate of the fourth transistor 414 may be connected to the inverter, and may be connected to the second drive circuit 430 through the inverter and the fifth node 445. A source of the fourth transistor 414 may be connected to the ground.

According to an embodiment, the second drive circuit 430 may be connected to the third transistor 413, the fourth transistor 414, the second capacitor 452, the second bias structure 462, and the fourth circuit 495. For example, the second drive circuit 430 may be connected to the gate of the third transistor 413 and the gate of the fourth transistor 414 through the fifth node 445. The second drive circuit 430 may be connected to the second capacitor 452 and the diode of the second bias structure 462 through a sixth node 446. The second drive circuit 430 may be connected to the block diode 498 through the sixth node 446. The second capacitor 452 may be connected to the third transistor 413, the fourth transistor 414, the inductor 403, the second bias structure 462, the second drive circuit 430, and the block diode 498. For example, the second capacitor 452 may be connected to the source of the third transistor 413, the inductor 403, and the drain of the fourth transistor 414 through the fifth node 445. The second capacitor 452 may be connected to the second drive circuit 430 and the diode of the second bias structure 462 through the sixth node 446. The second capacitor 452 may be connected to the block diode 498 through the sixth node 446.

According to an embodiment, the fourth circuit 495 may connect the first circuit 401 and the second circuit 402. For example, the damping resistor 497 and the block diode 498 of the fourth circuit 495 may be connected in series between the sixth node 446 and the third node 443. The first circuit 401 and the second circuit 402 may be connected to each other by the damping resistor 497 and the block diode 498. According to an embodiment, the Zener diode 496 may be connected in parallel to the first capacitor 451.

According to an embodiment, the converter 400 may transmit the output voltage to the power amplifier 480 by stepping down and/or stepping up the inputted voltage. For example, in case that the converter 400 operates in the buck mode, the converter 400 may transmit an output voltage lower than the inputted voltage to the power amplifier 480. Alternatively or additionally, in a case that the converter 400 operates in the boost mode, the converter 400 may deliver an output voltage higher than the inputted voltage to the power amplifier 480.

Continuing to refer to FIG. 4, in a case of the converter 400 operating in burst mode, the third transistor 413 and the fourth transistor 414 of the second circuit 402 of the converter 400 may operate complementarily. For example, when the third transistor 413 is in the on state, the fourth transistor 414 may be in the off state. Alternatively or additionally, when the third transistor 413 is in the off state, the fourth transistor 414 may be in the on state. By the complementary operation of third transistor 413 and the fourth transistor 414, the second circuit 402 may transmit the step-up converted input voltage to the power amplifier 480. In such an embodiment, the first transistor 411 of the first circuit 401 may need to be maintained in the on state and the second transistor 412 may need to be maintained in the off state. For example, the stored voltage of the first capacitor 451 may be used to maintain the first transistor 411 in the on state. The first capacitor 451 may be discharged and charged. For example, the first capacitor 451 may be discharged to a value between the voltage +Vdd of the first node 441 and the voltage of the first node 441. In addition, the first capacitor 451 may be charged by the current introduced from the first circuit 401 through the damping resistor 497 and the block diode 498 of the fourth circuit 495. That is, in a case that the converter 400 operates in the buck mode, the fourth circuit 495 may draw current generated by complementary operating transistors (e.g., the third transistor 413 and the fourth transistor 414) from the second circuit 402 to the first circuit 401.

According to the above, the converter 400 to which the fourth circuit 495 connecting the first circuit 401 and the second circuit 402 is added may be charged without completely discharging the first capacitor 451 even in case of operating in the burst mode. Accordingly, the first transistor 411 may be continuously maintained in the on state while the converter 400 is operating in the burst mode. While the converter 400 operates in the burst mode, since the first transistor 411 is maintained in the on state, an unnecessary ripple voltage may not be generated in the converter 400. That is, the converter 400 may step-down the inputted signal and transmit the same to the power amplifier 480 in a stable state. Thus, the power amplifier 480 may be driven by receiving a stable signal, and calibration of the power amplifier 480 may be minimized. In addition, the converter 400 may reduce an unnecessary ripple voltage through the fourth circuit 495 configured with a simple structure.

Figure 5:
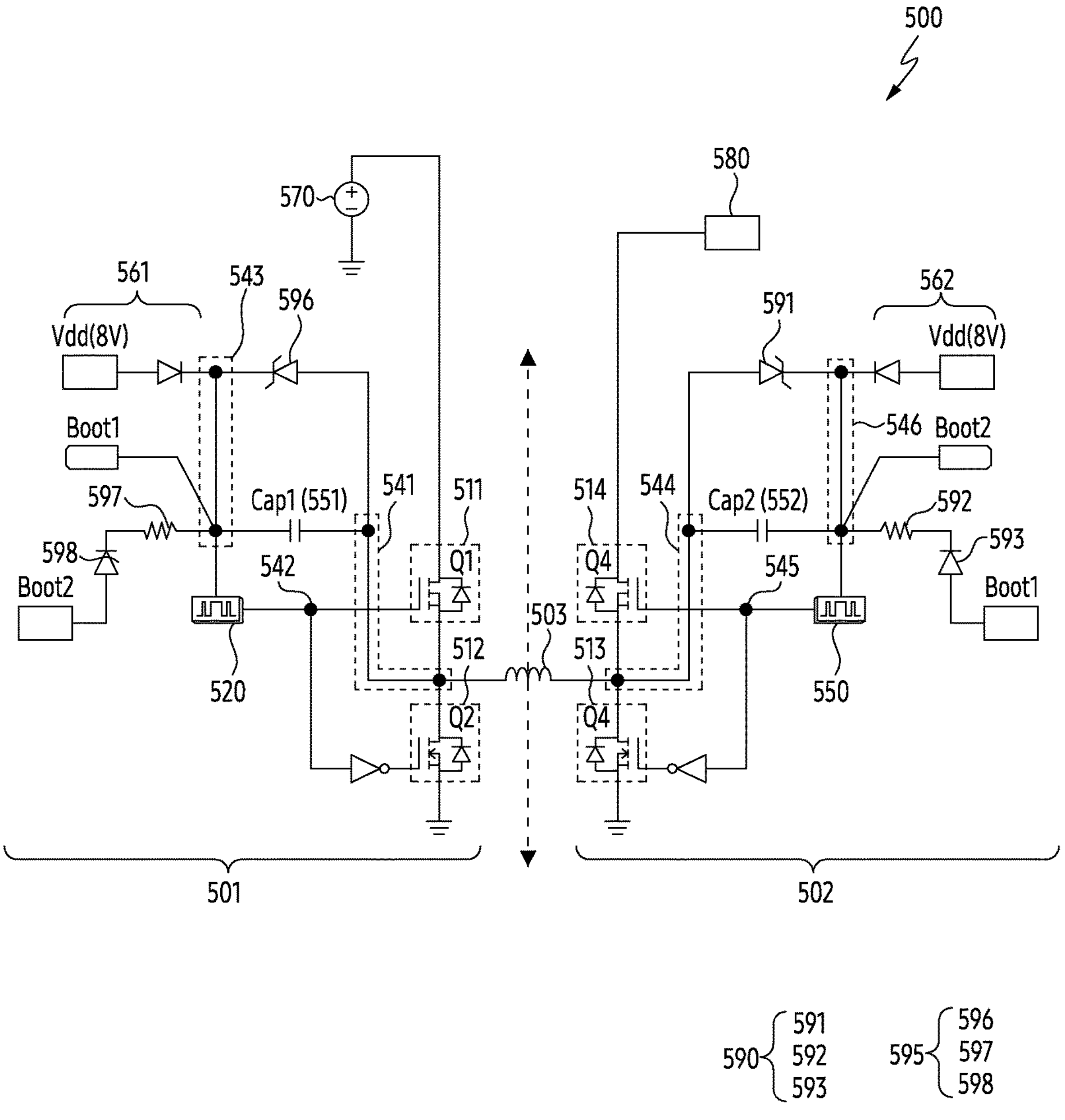
FIG. 5 illustrates an example of a buck-boost converter according to embodiments.

FIG. 5 illustrates an example of a buck-boost converter according to embodiments. The buck-boost converter of FIG. 5 may be an example of a converter operating in a buck mode and/or a boost mode. In an embodiment, the buck may refer to the stepping-down of the voltage, and the boost may refer to the stepping-up of the voltage.

Referring to FIG. 5, according to an embodiment, the converter 500 may include a first circuit 501 configured to perform a buck operation (e.g., a buck circuit), a second circuit 502 configured to perform a boost operation (e.g., a boost circuit), a third circuit 590 for charging a second capacitor 552, and a fourth circuit 595 for charging a first capacitor 551. In an embodiment, the converter 500 may include an inductor 503 connecting the first circuit 501 and the second circuit 502, and the inductor 503 may be disposed between the first circuit 501 and the second circuit 502.

According to an embodiment, the converter 500 may include a plurality of transistors 511, 512, 513, and 514. For example, the transistor may include a field effect transistor (FET). The plurality of transistors 511 to 514 may be disposed in the first circuit 501 and/or the second circuit 502. For example, the first circuit 501 may include the first transistor 511 and the second transistor 512, and the second circuit 502 may include the third transistor 513 and the fourth transistor 514. The plurality of transistors 511 to 514 may control the flow of current through switching, and thus, may be referred to as switches. Each of the transistors 511 to 514 may include a parasitic diode and/or an internal diode.

According to an embodiment, the converter 500 may include driver circuits 520 and 530 (or a drive circuit) for driving transistors. For example, the converter 500 may include a first drive circuit 520 for driving the first transistor 511 and the second transistor 512 of the first circuit 501. In addition, the converter 500 may include a second drive circuit 530 for driving the third transistor 513 and the fourth transistor 514 of the second circuit 502.

According to an embodiment, the converter 500 may include capacitors 551 and 552 for maintaining voltages of driver circuits. For example, the converter 500 may include the first capacitor 551 for maintaining a voltage of the first drive circuit 520. The converter 500 may include the second capacitor 552 for maintaining a voltage of the second drive circuit 530.

According to an embodiment, the converter 500 may include bias structures 561 and 562 for applying a driving voltage of the driver circuit. For example, the converter 500 may include a first bias structure 561, and the first bias structure 561 may include a bias power Vdd and a diode. In addition, the converter 500 may include a second bias structure 562, and the second bias structure 562 may include the bias power Vdd and the diode. As shown in FIG. 5, the bias power (Vdd) is a voltage source of 8V, but this is only an example. However, the present disclosure is not limited in this regard, and the bias power Vdd may be and/or may include voltage sources having other voltage levels. In an embodiment, a diode of the first bias structure 561 may be configured to prevent the flow of current applied from the bias power Vdd to the first capacitor 551 and/or the first drive circuit 520. A diode of the second bias structure 562 may be configured to prevent the reverse flow of current applied to the second capacitor 552 and/or the second drive circuit 530.

According to an embodiment, the converter 500 may be connected (e.g., coupled) to an input power 570 through a drain of the first transistor 511. In addition, the converter 500 may be connected to the power amplifier 580 through a drain of the third transistor 513. For example, the power amplifier 580 may refer to a drain of the power amplifier 580.

According to an embodiment, the converter 500 may include the third circuit 590 for charging the second capacitor 552. The third circuit 590 may include a Zener diode 591, a resistor 592, and a diode 593. Here, the Zener diode 591 may be an element used to maintain a constant voltage even when a change in current occurs. That is, the Zener diode 591 may be used in a reverse direction unlike a general diode. The resistor 592 may be an element used for removing noise and for impedance matching. The resistor 592 may be connected in series to a signal line with a high frequency and may be referred to as a damping resistor. The diode 593 may be and/or may include an element for preventing reverse flow of current flowing from the first circuit 501 to the second circuit 502. In an embodiment, the diode 593 may be referred to as a block diode and/or a blocking diode.

According to an embodiment, the converter 500 may include the fourth circuit 595 for charging the first capacitor 451. The fourth circuit 495 may include a Zener diode 596, a resistor 597, and a diode 598. Here, the Zener diode 596 may be an element used to maintain a constant voltage even when a change in current occurs. That is, the Zener diode 596 may be used in the a reverse direction unlike a general diode. The resistor 597 may be an element used for removing noise and for impedance matching. The resistor 597 may be connected in series to a signal line with a high frequency and may be referred to as the damping resistor. The diode 598 may be and/or may include an element for preventing reverse flow of current flowing from the second circuit 502 to the first circuit 401. In an embodiment, the diode 598 may be referred to as the block diode or the blocking diode.

Referring to the first circuit 501, according to an embodiment, the first transistor 511 may be connected to the input power 570, the second transistor 512, the first drive circuit 520, the inductor 503, the first capacitor 551, and the fourth circuit 595. For example, the drain of the first transistor 511 may be connected to the input power 570. A gate of the first transistor 511 may be connected to the first drive circuit 520 through a second node 542. A source of the first transistor 511 may be connected to the drain of the inductor 503 and/or the second transistor 512 through a first node 541. In addition, the source of the first transistor 511 may be connected to the first capacitor 551 and/or the Zener diode 596 through the first node 541. The second transistor 512 may be connected to the first transistor 511, the inductor 503, the first drive circuit 520, a ground GND, the first capacitor 551, and the fourth circuit 595. For example, a drain of the second transistor 512 may be connected to the source of the first transistor 511, the inductor 503, and the first capacitor 551 through the first node 541. The drain of the second transistor 512 may be connected to the Zener diode 596 through the first node 541. A gate of the second transistor 512 may be connected to the first drive circuit 520. In such an example, the gate of the second transistor 512 may be connected to the inverter, and/or may be connected to the first drive circuit 520 through the inverter and the second node 542. A source of the second transistor 512 may be connected to the ground.

According to an embodiment, the first drive circuit 520 may be connected to the first transistor 511, the second transistor 512, the first capacitor 551, and the first bias structure 561. For example, the first drive circuit 520 may be connected to the gate of the first transistor 511 and/or the gate of the second transistor 512 through the second node 542. The first drive circuit 520 may be connected to the first capacitor 551 and the diode of the first bias structure 561 through a third node 543. The first drive circuit 520 may be connected to the third circuit 590 through the third node 543. For example, the first drive circuit 520 may be connected to the block diode 593 through the third node 543. The first drive circuit 520 may be connected to the fourth circuit 595 through the third node 543. For example, the first drive circuit 520 may be connected to the Zener diode 596 and the damping resistor 597 through the third node 543.

According to an embodiment, the first capacitor 551 may be connected to the first transistor 511, the second transistor 512, the inductor 503, the first bias structure 561, and the first drive circuit 520. For example, the first capacitor 551 may be connected to the source of the first transistor 511, the inductor 503, and the drain of the second transistor 512 through the second node 542. The first capacitor 551 may be connected to the first drive circuit 520 and the diode of the first bias structure 561 through the third node 543. In addition, the first capacitor 551 may be connected to the third circuit 590 through the third node 543. For example, the first capacitor 551 may be connected to the block diode 593 through the third node 543. The first capacitor 551 may be connected to the fourth circuit 595 through the third node 543. For example, the first capacitor 551 may be connected to the Zener diode 596 and the damping resistor 597 through the third node 543. In such an example, the first capacitor 551 may be connected in parallel to the Zener diode 596. That is, the first capacitor 551 may be connected to the second circuit 502 through the fourth circuit 595, and current may be applied to the first capacitor 551 from the second circuit 502.

Referring to the second circuit 502, the third transistor 513 may be connected to the power amplifier 580, the fourth transistor 514, the second drive circuit 530, the inductor 503, the second capacitor 552, and the third circuit 590. For example, the drain of the third transistor 513 may be connected to the drain of the power amplifier 580. A gate of the third transistor 513 may be connected to the second drive circuit 530 through a fifth node 545. A source of the third transistor 513 may be connected to the inductor 503 and a drain of the fourth transistor 514 through a fourth node 544. In addition, the source of the third transistor 513 may be connected to the second capacitor 552 and the Zener diode 591 through the fourth node 544. The fourth transistor 514 may be connected to the third transistor 513, the inductor 503, the second drive circuit 530, the ground GND, the second capacitor 552, and the third circuit 590. For example, the drain of the fourth transistor 514 may be connected to the source of the third transistor 513, the inductor 503, and the second capacitor 552 through the fourth node 544. The drain of the fourth transistor 514 may be connected to the Zener diode 591 through the fourth node 544. A gate of the fourth transistor 514 may be connected to the second drive circuit 530. In such an example, the gate of the fourth transistor 514 may be connected to the inverter, and may be connected to the second drive circuit 530 through the inverter and the fifth node 545. A source of the fourth transistor 514 may be connected to the ground.

According to an embodiment, the second drive circuit 530 may be connected to the third transistor 513, the fourth transistor 514, the second capacitor 552, and the second bias structure 562. For example, the second drive circuit 530 may be connected to the gate of the third transistor 513 and the gate of the fourth transistor 514 through the fifth node 545. The second drive circuit 530 may be connected to the second capacitor 552 and the diode of the second bias structure 562 through a sixth node 546. The second drive circuit 530 may be connected to the third circuit 590 through the sixth node 546. For example, the second drive circuit 530 may be connected to the Zener diode 591 and the damping resistor 592 through the sixth node 546.

According to an embodiment, the second capacitor 552 may be connected to the third transistor 513, the fourth transistor 514, the inductor 503, the second bias structure 562, and the second drive circuit 530. For example, the second capacitor 552 may be connected to the source of the third transistor 513, the inductor 503, and the drain of the fourth transistor 514 through the fifth node 545. The second capacitor 552 may be connected to the second drive circuit 530 and the diode of the second bias structure 562 through the sixth node 546. In addition, the second capacitor 552 may be connected to the fourth circuit 595 through the sixth node 546. For example, the second capacitor 552 may be connected to the block diode 593 through the sixth node 546. The second capacitor 552 may be connected to the third circuit 590 through the sixth node 546. For example, the second capacitor 552 may be connected to the Zener diode 591 and the damping resistor 592 through the sixth node 546. In this case, the second capacitor 552 may be connected in parallel to the Zener diode 591. That is, the second capacitor 552 may be connected to the first circuit 501 through the third circuit 590, and current may be applied to the second capacitor 552 from the first circuit 501.

According to an embodiment, the third circuit 590 may connect the first circuit 501 and the second circuit 502. For example, the damping resistor 592 and the block diode 593 of the third circuit 590 may be connected in series each other between the sixth node 546 and the third node 543. The first circuit 501 and the second circuit 502 may be connected by the damping resistor 592 and the block diode 593. According to an embodiment, the Zener diode 591 may be connected in parallel to the second capacitor 552.

According to an embodiment, the fourth circuit 595 may connect the first circuit 501 and the second circuit 502. For example, the damping resistor 597 and the block diode 598 of the fourth circuit 595 may be connected in series each other between the sixth node 546 and the third node 543. The first circuit 501 and the second circuit 502 may be connected by the damping resistor 597 and the block diode 598. According to an embodiment, the Zener diode 596 may be connected in parallel to the first capacitor 551.

According to an embodiment, the converter 500 may transmit the output voltage to the power amplifier 580 by stepping down and/or stepping up the inputted voltage. For example, in a case that the converter 500 operates in the buck mode, the converter 500 may transmit an output voltage lower than the inputted voltage to the power amplifier 580. Alternatively or additionally, in a case that the converter 500 operates in the boost mode, the converter 500 may deliver an output voltage higher than the inputted voltage to the power amplifier 580.

Continuing to refer to FIG. 5, in a case of the converter 500 operating in buck mode, the first transistor 511 and the second transistor 512 of the first circuit 501 of the converter 500 may operate complementarily. For example, when the first transistor 511 is in the on state, the second transistor 512 may be in the off state. Alternatively or additionally, when the first transistor 511 is in the off state, the second transistor 512 may be in the on state. By the complementary operation of the first transistor 511 and the second transistor 512, the first circuit 501 may transmit the step-down converted input voltage to the second circuit 502. However, in order to transmit the step-down input voltage to the power amplifier 580, the third transistor 513 of the second circuit 502 may need to be maintained in the on state and the fourth transistor 514 may need to be maintained in the off state. In an embodiment, the third transistor 513 may be maintained in the on state using a stored voltage of the second capacitor 552. The second capacitor 552 may be discharged and charged. For example, the second capacitor 552 may be discharged to a value between the voltage +Vdd of the fourth node 544 and the voltage of the fourth node 544. In addition, the second capacitor 552 may be charged by the current introduced from the first circuit 501 through the damping resistor 592 and the block diode 593 of the third circuit 590. That is, in a case that the converter 500 operates in buck mode, the third circuit 590 may draw current generated by complementary operating transistors (e.g., the first transistor 511 and the second transistor 512) from the first circuit 501 to the second circuit 502.

Continuing to refer to FIG. 5, in a case of operating the converter 500 in burst mode, the third transistor 513 and the fourth transistor 514 of the second circuit 502 of the converter 500 may operate complementary. For example, in a case that the third transistor 513 is in the on state, the fourth transistor 514 may be in the off state. Alternatively or additionally, in a case that the third transistor 513 is in the off state, the fourth transistor 514 may be in the on state. By the complementary operation of the third transistor 513 and the fourth transistor 514, the second circuit 502 may transmit the step-up converted input voltage to the power amplifier 580. In such an example, the first transistor 511 of the first circuit 501 may need to be maintained in the on state and the second transistor 512 may need to be maintained in the off state. In an embodiment, the first transistor 511 may be maintained in the on state using a stored voltage of the first capacitor 551. The first capacitor 551 may be discharged and charged. For example, the first capacitor 551 may be discharged to a value between the voltage +Vdd of the first node 541 and the voltage of the first node 541. In addition, the first capacitor 551 may be charged by the current introduced from the first circuit 501 through the damping resistor 597 and the block diode 598 of the fourth circuit 595. That is, in a case that the converter 500 operates in the buck mode, the fourth circuit 595 may draw current generated by complementary operating transistors (e.g., the third transistor 513 and the fourth transistor 514) from the second circuit 502 to the first circuit 501.

Although not illustrated in FIG. 5, according to an embodiment, the converter 500 may include a configuration capable of selecting the third circuit 590 and the fourth circuit 595. For example, the converter 500 may include a switch structure capable of switching the third circuit 590 and the fourth circuit 595. Alternatively or additionally, the converter 500 may include a structure capable of temporarily disconnecting and reconnecting the connection of the third circuit 590 or the fourth circuit 595. Accordingly, the connection state of the third circuit 590 or the fourth circuit 595 may be changed according to the mode of the converter 500.

According to the above, the converter 500 to which the third circuit 590 and the fourth circuit 595 connecting the first circuit 501 and the second circuit 502 are added may not generate an unnecessary ripple voltage. That is, the converter 500 may step-down and/or step-up the inputted signal and transmit the same to the power amplifier 580 in a stable state. Accordingly, the power amplifier 580 may be driven by receiving a stable signal, and calibration of the power amplifier 580 may be minimized. In addition, the converter 500 may reduce an unnecessary ripple voltage through the third circuit 590 and/or the fourth circuit 595 configured with a simple structure.

Figure 6A:
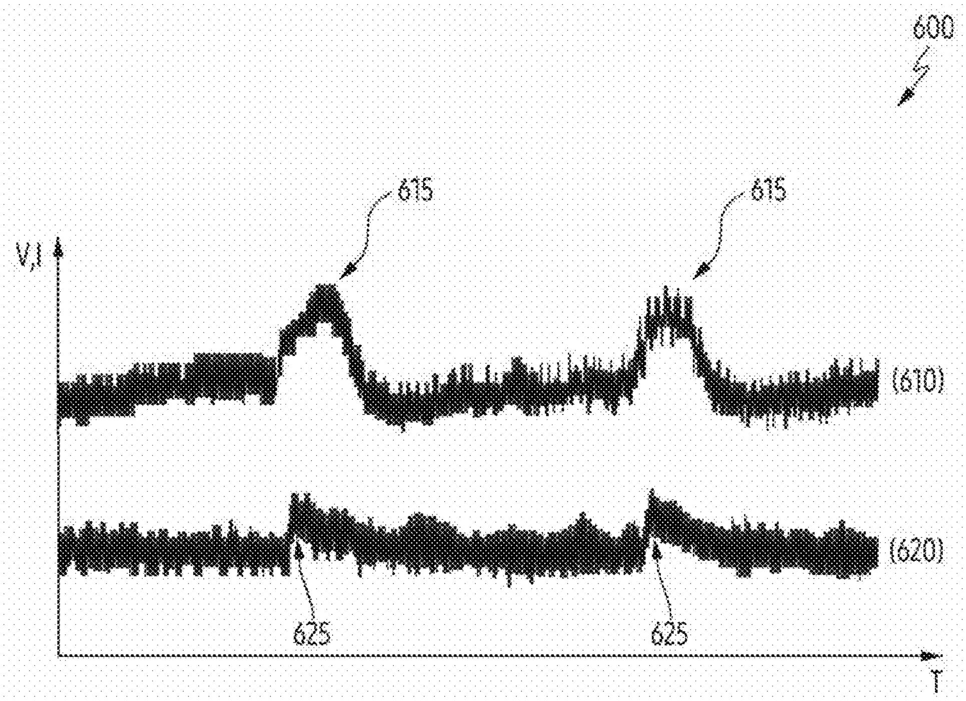
FIG. 6A (RELATED ART)
FIGS. 6A and 6B illustrate examples of performance graphs of a converter, according to embodiments.
Figure 6B:
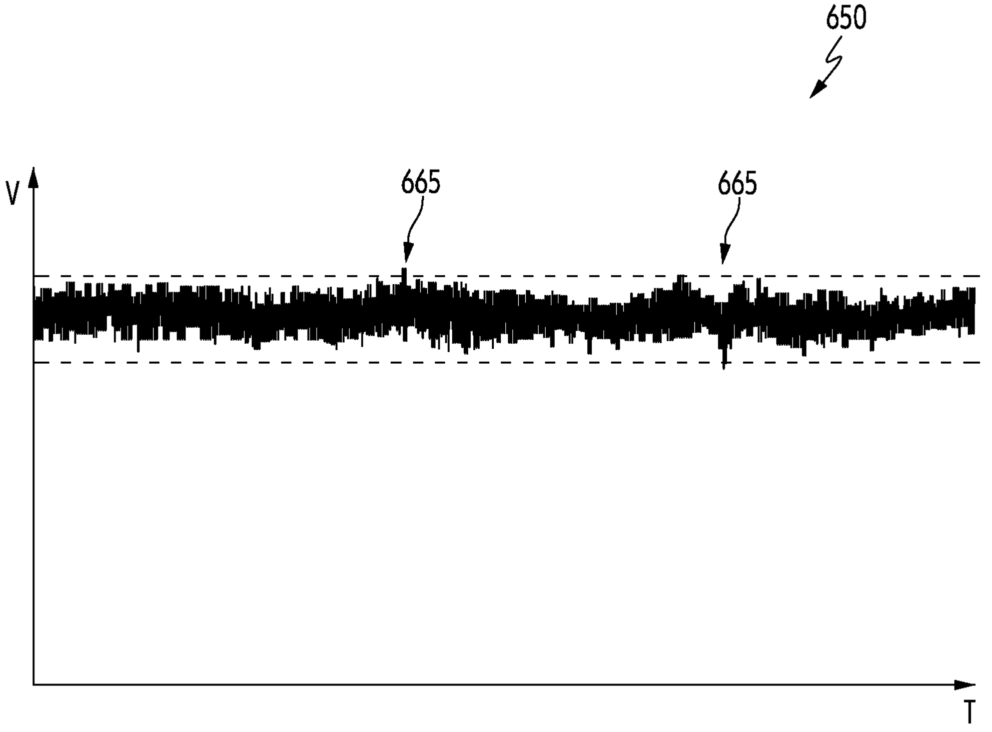

FIGS. 6A and 6B illustrate examples of performance graphs of a converter according to embodiments. FIG. 6A illustrates a voltage and a current outputted by a converter 200 operating in the buck mode of FIG. 2. FIG. 6B illustrates a voltage outputted by a converter 300 operating in the buck mode of FIG. 3.

Referring to FIG. 6A, a graph 600 illustrates a first line 610 illustrating the voltage outputted by the converter 200 over time and a second line 620 illustrating the current outputted by the converter 200 over time. The horizontal axis of the graph 600 represents time T, and the vertical axis represents the voltage output (e.g., in millivolt (mV) units) and/or the current output (e.g., in milliampere (mA) units) of the converter 200.

For example, the converter 200 may temporarily operate in the boost mode in order to charge a capacitor (e.g., first capacitor 251, second capacitor 252) when the capacitor has been discharged over time. Referring to the first line 610 and the second line 620, a ripple voltage 615 and a ripple current 625 may be generated by the temporary boost mode operation of the converter 200. For example, the ripple voltage 615 may be formed to a magnitude of about 100 mV, and the ripple current 625 may be formed to a magnitude of about 30 mA. Accordingly, the current applied to the power amplifier may have a magnitude between about 15 mA and about 54 mA.

In contrast, referring to FIG. 6B, a graph 650 illustrates a third line illustrating the voltage outputted by the converter 300 over time. The horizontal axis of the graph 650 represents time T, and the vertical axis represents the voltage output (e.g., in mV units) of the converter 300.

Since the converter 300 includes a circuit (e.g., a third circuit 390) for charging the capacitor, the capacitor may not be discharged and may not operate in the boost mode even when time passes. Referring to the third line, a relatively stabilized ripple voltage 665 may be generated. For example, the ripple voltage 665 may be formed to a magnitude of about 40 mV. Accordingly, the current applied to the power amplifier may have a magnitude between about 29 mA and about 39 mA.

Referring to FIGS. 6A and 6B, a converter (e.g., a converter 300 of FIG. 3) to which a simple structure is added may have smaller voltage ripple and current ripple or voltage ripple and current ripple may not occur compared to converters (e.g., a converter 200 of FIG. 2) that do not include the simple structure. In addition, a component (e.g., the power amplifier) connected to the output end of the converter may receive a stabilized signal. For example, according to the structure of the converter 300 of FIG. 3, the deviation of the current applied to the power amplifier may be lower than that of the converter 200 of FIG. 2. That is, the ripple voltage may be reduced, and accordingly, the signal inputted to the power amplifier may be comparatively more stable.

Referring to FIGS. 1 to 6B, a converter for reducing generation of ripple according to embodiments of the present disclosure may reduce and/or prevent generation of ripple by adding a circuit having a simple structure. Accordingly, the power amplifier receiving the signal from the converter may maintain linearity. In addition, the power amplifier that receives the signal from the converter may perform a calibration process in a more simplified manner and/or with a reduced number of times. As a result, through the structure of the converter, errors in the production process of the power amplifier connected to the converter and the electronic device including the same may be reduced, and production costs may be reduced.

Figure 7:
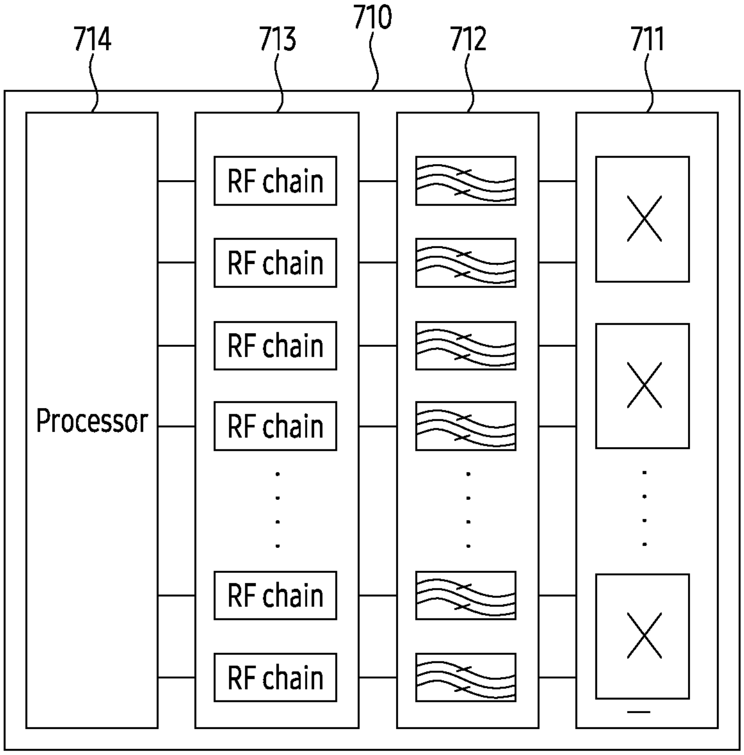
FIG. 7 illustrates a functional configuration of an electronic device according to embodiments.

FIG. 7 illustrates a functional configuration of an electronic device, according to various embodiments. An electronic device 710 may be and/or may include at least one of a base station (e.g., base station 110) and a terminal (e.g., terminal 120, terminal 130). According to an embodiment, the electronic device 710 may be and/or may include an mmWave device. Not only the converter itself for reducing generation of ripple mentioned through FIGS. 1 to 6B, but also the structure of a radio frequency (RF) chain including the same and the electronic device including the same are also included in the embodiments of the present disclosure.

Referring to FIG. 7, an exemplary functional configuration of the electronic device 710 is illustrated. The electronic device 710 may include an antenna unit 711, a filter unit 712, an RF processing unit 713, and a control unit 714.

The antenna unit 711 may include a plurality of antennas. The antenna performs functions for transmitting and receiving signals through a wireless channel. An antenna may include a conductor formed on a substrate (e.g., an antenna PCB, an antenna board) or a radiator formed of a conductive pattern. The antenna may radiate the up-converted signal on a wireless channel or may obtain a signal radiated by another device. Each antenna may be referred to as an antenna element. In some embodiments, the antenna unit 711 may include an antenna array (e.g., a sub array) in which a plurality of antenna elements form an array. The antenna unit 711 may be electrically connected to the filter unit 712 through RF signal lines. The antenna unit 711 may be mounted on a PCB including the plurality of antenna elements. The PCB may include a plurality of RF signal lines connecting each antenna element and a filter of the filter unit 712. These RF signal lines may be referred to as a feeding network. The antenna unit 711 may provide the received signal to the filter unit 712 or may radiate the signal provided from the filter unit 712 into the air.

The antenna unit 711 according to various embodiments may include at least one antenna module having a dual polarization antenna. The dual polarization antenna may be, for example, a cross-pole (x-pole) antenna. The dual polarization antenna may include two antenna elements corresponding to different polarizations. For example, the dual polarization antenna may include a first antenna element having a polarization of +45° and a second antenna element having a polarization of −45°. It goes without saying that the polarization may be formed of other orthogonal polarizations other than +45° and −45°. Each antenna element may be connected to a feeding line and electrically connected to the filter unit 712, the RF processing unit 713, and the control unit 714 to be described later.

The dual polarization antenna may be a patch antenna (or a microstrip antenna). The dual polarization antenna may be easily implemented and integrated into an array antenna by having the form of the patch antenna. Two signals having different polarizations may be inputted to each antenna port. Each antenna port corresponds to the antenna element. For high efficiency, it is required to optimize the relationship between a co-pol characteristic and a cross-pol characteristic between two signals with different polarizations. In a dual polarization antenna, the co-pol characteristic represents a characteristic for a specific polarization component, and the cross-pol characteristic represents a characteristic for a polarization component different from the specific polarization component. A structure including asymmetric antenna elements according to embodiments of the present disclosure may be included in the antenna unit 711 of FIG. 7.

The filter unit 712 may perform filtering in order to transmit a signal of a desired frequency. The filter unit 712 may perform a function of selectively identifying the frequency by forming a resonance. In some embodiments, the filter unit 712 may form the resonance through a cavity structurally including a dielectric. In addition, in some embodiments, the filter unit 712 may form the resonance through elements forming inductance or capacitance. In addition, in some embodiments, the filter unit 712 may include an elastic filter such as a bulk acoustic wave (BAW) filter or a surface acoustic wave (SAW) filter. The filter unit 712 may include at least one of a band pass filter, a low pass filter, a high pass filter, and a band reject filter. In other words, the filter unit 712 may include RF circuits for obtaining a signal of a frequency band for transmission or a frequency band for reception. The filter unit 712 according to various embodiments may electrically connect the antenna unit 711 and the RF processing unit 713.

The RF processing unit 713 may include a plurality of RF paths. The RF path may be a unit of a path through which a signal received through an antenna or a signal radiated through an antenna passes. At least one RF path may be referred to as an RF chain. The RF chain may include a plurality of RF elements. The RF elements may include an amplifier, a mixer, an oscillator, a DAC, an ADC, and the like. For example, the RF processing unit 713 may include an up converter that up-converts a base band digital transmission signal to a transmission frequency, and a digital-to-analog converter (DAC) that converts the up-converted digital transmission signal into an analog RF transmission signal. The up converter and the DAC form part of a transmission path. The transmission path may further include a power amplifier (PA) or a coupler (or combiner). In addition, for example, the RF processing unit 713 may include an analog-to-digital converter (ADC) that converts an analog RF reception signal into a digital reception signal and a down converter that converts a digital reception signal into a baseband digital reception signal. The ADC and the down converter form part of a reception path. The reception path may further include a low-noise amplifier (LNA) or a coupler (or a divider). RF components of the RF processing unit may be implemented on the PCB. The electronic device 710 may include a structure stacked in the order of the antenna unit 711—the filter unit 712—and the RF processing unit 713. The antennas and the RF components of the RF processing unit may be implemented on the PCB, and filters may be repeatedly fastened between the PCB and the PCB to form a plurality of layers. A converter 300, a converter 400, and a converter 500 according to embodiments of the present disclosure may be included in the RF processing unit 713.

The control unit 714 may control overall operations of the electronic device 710. The control unit 714 may include various modules for performing communication. The control unit 714 may include at least one processor such as a modem. The control unit 714 may include modules for digital signal processing. For example, the control unit 714 may include a modem. When transmitting data, the control unit 714 generates complex symbols by encoding and modulating the transmission bit string. In addition, for example, when receiving data, the control unit 714 restores the reception bit string by demodulating and decoding the baseband signal. The control unit 714 may perform functions of a protocol stack required by a communication standard.

In FIG. 7, a functional configuration of the electronic device 710 as equipment for which the converter structure of the present disclosure may be utilized has been described. However, the example illustrated in FIG. 7 is only an exemplary configuration for utilization of a structure including a converter according to embodiments of the present disclosure described with reference to FIGS. 1 to 6B and the electronic device including the same, and the embodiments of the present disclosure are not limited to the components of the equipment illustrated in FIG. 7. Thus, a configuration of communication equipment including the converter structure, according to embodiments of the present disclosure, and communication equipment including the same may also be understood as an embodiment of the present disclosure.

As described above, the converter of a wireless communication system may comprise a first circuit configured to perform a buck operation. The converter may comprise a second circuit configured to perform a boost operation. The converter may comprise an inductor coupling the first circuit and the second circuit. The converter may comprise a third circuit including a first resistor and a first diode. The first circuit may include a first FET, a second FET, a first capacitor, and a first drive circuit. The first capacitor may be coupled to the first FET and the second FET. The first drive circuit may be coupled to the first FET, the second FET, and the first capacitor. The second circuit may include a third FET, a fourth FET, a second capacitor, a second drive circuit, and a first Zener diode. The second capacitor may be coupled to the third FET and the fourth FET. The second drive circuit may be coupled to the third FET, the fourth FET, the second capacitor, and the first Zener diode. The third circuit may be coupled to a first node to which the first drive circuit and the first capacitor are coupled and is coupled to a second node to which the second drive circuit, the second capacitor, and the first Zener diode are coupled.

According to an embodiment, the first drive circuit may be coupled to a gate of the first FET and a gate of the second FET. The second drive circuit may be coupled to a gate of the third FET and a gate of the fourth FET.

According to an embodiment, the first capacitor may be coupled to the first FET and the second FET in a third node to which a source of the first FET and a drain of the second FET are coupled. The second capacitor may be coupled to the first Zener diode, the third FET and the fourth FET in a fourth node to which a source of the third FET and a drain of the fourth FET are coupled.

According to an embodiment, the inductor may be disposed between the third node and the fourth node.

According to an embodiment, the first Zener diode may be coupled to the second capacitor in parallel.

According to an embodiment, the converter may further include second resistor, a fourth circuit including second diode, and second Zener diode. The fourth circuit may couple the first node and the second node. The second Zener diode may be included in the first circuit and may be coupled to the first drive circuit.

According to an embodiment, the first capacitor may be coupled to the first FET, the second FET, and the second Zener diode in a node to which a source of the first FET and a drain of the second FET are coupled.

According to an embodiment, the second Zener diode may be coupled to the first capacitor in parallel.

According to an embodiment, a drain of the first FET may be coupled to an input power of the converter. A drain of the third FET may be coupled to a power amplifier.

According to an embodiment, the converter may include a first bias structure and a second bias structure. The first bias structure may include a first bias power and a first bias diode and may be coupled to the first node. The second bias structure may include a second bias power and a second bias diode and may be coupled to the second node.

As described above, the base station of the wireless communication system may comprise at least one processor. The base station may comprise a plurality of RF chains radio frequency (RF) chains coupled to the at least one process. The base station may comprise a plurality of antenna elements coupled to the plurality of RF chains. In the base station, a RF chain of the plurality of RF chains may include a converter and a power amplifier. The converter may comprise a first circuit configured to perform a buck operation. The converter may comprise a second circuit configured to perform a boost operation. The converter may comprise an inductor coupling the first circuit and the second circuit. The converter may comprise a third circuit including a first resistor and a first diode. The first circuit may include a first FET, a second FET, a first capacitor, and a first drive circuit. The first capacitor may be coupled to the first FET and the second FET. The first drive circuit may be coupled to the first FET, the second FET, and the first capacitor. The second circuit may include a third FET, a fourth FET, a second capacitor, a second drive circuit, and a first Zener diode. The second capacitor may be coupled to the third FET and the fourth FET. The second drive circuit may be coupled to the third FET, the fourth FET, the second capacitor, and the first Zener diode. The third circuit may couple a first node to which the first drive circuit and the first capacitor are coupled and a second node to which the second drive circuit, the second capacitor, and the first Zener diode are coupled.

According to an embodiment, the first drive circuit may be coupled to a gate of the first FET and a gate of the second FET. The second drive circuit may be coupled to a gate of the third FET and a gate of the fourth FET.

According to an embodiment, the first capacitor may be coupled to the first FET and the second FET in a third node to which a source of the first FET and a drain of the second FET are coupled. The second capacitor may be coupled to the first Zener diode, the third FET and the fourth FET in a fourth node to which a source of the third FET and a drain of the fourth FET are coupled.

According to an embodiment, the inductor may be disposed between the third node and the fourth node to which a source of the third FET and a drain of the fourth FET are coupled.

According to an embodiment, the first Zener diode may be coupled to the second capacitor in parallel.

According to an embodiment, the converter further may include second resistor, a fourth circuit including second diode, and second Zener diode. The fourth circuit may couple the first node and the second node. The second Zener diode may be included in the first circuit and may be coupled to the first drive circuit.

According to an embodiment, the first capacitor may be coupled to the first FET, the second FET, and the second Zener diode in a node to which a source of the first FET and a drain of the second FET are coupled.

According to an embodiment, the other Zener diode may be coupled to the first capacitor in parallel.

According to an embodiment, a drain of the first FET may be coupled to an input power of the converter. A drain of the third FET may be coupled to a power amplifier.

According to an embodiment, the converter further may include a first bias structure and a second bias structure. The first bias structure may include a first bias power and a first bias diode, and may be coupled to the first node. The second bias structure may include a second bias power and a second bias diode, and may be coupled to the second node.

Methods according to the embodiments described in the claims and/or the specification of the present disclosure may be implemented in the form of hardware, software, or a combination of hardware and software.

When implemented as software, a computer-readable storage medium storing one or more programs (e.g., a software module) may be provided. The one or more programs stored in the computer-readable storage medium may be configured for execution by one or more processors in the electronic device. The one or more programs may include instructions that cause the electronic device to execute methods according to embodiments described in the claims or the specification of the present disclosure.

Such programs (e.g., software modules, software) may be stored in random access memory (RAM), non-volatile memory including flash memory, read only memory (ROM), electrically erasable programmable read only memory (EEPROM), magnetic disc storage device, compact disc-ROM (CD-ROM), digital versatile disc (DVD) and/or other form of optical storage, magnetic cassette. Alternatively or additionally, the programs may be stored in a memory configured with some and/or all combinations thereof. Alternatively or additionally, each memory configuration may be include a plurality of the corresponding memory configuration.

In addition, the program may be stored in an attachable storage device that may be accessed through a communication network, such as, but not limited to, the Internet, an intranet, a local area network (LAN), a wide area network (WAN), a storage area network (SAN), and/or a combination thereof. Such a storage device may be connected to a device performing an embodiment of the present disclosure through an external port. Alternatively or additionally, a separate storage device on the communication network may access a device performing an embodiment of the present disclosure.

In the above-described embodiments of the present disclosure, the components included in the disclosure may be expressed in singular and/or plural according to the presented embodiment. However, singular and/or plural expressions may be chosen appropriately for the situation presented for convenience of explanation, and the present disclosure may not be limited to a singular and/or a plural component, and even if the component is expressed in plural, it may be configured with singular, or even if it is expressed in singular, it may be configured with plural.

In the description of the present disclosure, the specific embodiment have been described, it is to be understood that various modifications may be possible within the limit while not departing from the scope of the present disclosure.

What is claimed is:

1. A converter of a wireless communication system, the converter comprising:

a first circuit configured to perform a buck operation;

a second circuit configured to perform a boost operation;

an inductor coupling the first circuit and the second circuit; and a third circuit comprising a first resistor and a first diode, wherein the first circuit comprises a first field effect transistor (FET), a second FET, a first capacitor, and a first drive circuit for driving the first FET and the second FET, wherein the first capacitor is coupled to the first FET and the second FET, wherein the first drive circuit is coupled to the first FET, the second FET, and the first capacitor, wherein the second circuit comprises a third FET, a fourth FET, a second capacitor, a second drive circuit for driving the third FET and the fourth FET, and a first Zener diode, wherein the second capacitor is coupled to the third FET and the fourth FET, wherein the second drive circuit is coupled to the third FET, the fourth FET, the second capacitor, and the first Zener diode, wherein a first node coupled to the first drive circuit and the first capacitor is coupled to a second node coupled to the second drive circuit, the second capacitor, and the first Zener diode through the first resistor and the first diode without a switching circuit, wherein the first diode is configured to conduct current in a direction from the first node to the second node, in case that the third FET is on state and the fourth FET is off state based on the second drive circuit, wherein the first diode is used to reduce or prevent current flowing from the second node to the first node, in case that the third FET is the on state and the fourth FET is off state based on the second drive circuit, and wherein the second capacitor is charged based on current introduced from the first node through the first resistor and the first diode to maintain a voltage of the second drive circuit, in case that the third FET is the on state and the fourth FET is off state based on the second drive circuit.

2. The converter of claim 1, wherein the first drive circuit is coupled to a first gate of the first FET and a second gate of the second FET, and wherein the second drive circuit is coupled to a third gate of the third FET and a fourth gate of the fourth FET.

3. The converter of claim 1, wherein the first capacitor is coupled to the first FET and the second FET at a third node to which a source of the first FET and a drain of the second FET are coupled, and wherein the second capacitor is coupled to the first Zener diode, the third FET, and the fourth FET at a fourth node to which a source of the third FET and a drain of the fourth FET are coupled, and is coupled to the first diode through the first resistor.

4. The converter of claim 3, wherein the inductor is disposed between the third node and the fourth node.

5. The converter of claim 1, wherein the first Zener diode is coupled to the second capacitor in parallel.

6. The converter of claim 1, wherein the converter further comprises a second resistor, a fourth circuit, and a second Zener diode, the fourth circuit comprising a second diode, wherein the fourth circuit couples the first node and the second node, wherein the first circuit comprises the second Zener diode, and wherein the second Zener diode is coupled to the first drive circuit.

7. The converter of claim 6, wherein the first capacitor is coupled to the first FET, the second FET, and the second Zener diode at a third node to which a source of the first FET and a drain of the second FET are coupled.

8. The converter of claim 6, wherein the second Zener diode is coupled to the first capacitor in parallel.

9. The converter of claim 1, wherein a drain of the first FET is coupled to an input power of the converter, and wherein a drain of the third FET is coupled to a power amplifier.

10. The converter of claim 1, wherein the converter further comprises a first bias structure and a second bias structure, wherein the first bias structure comprises a first bias power and a first bias diode and is coupled to the first node, and wherein the second bias structure comprises a second bias power and a second bias diode and is coupled to the second node.

11. A base station of a wireless communication system, the base station comprising:

at least one processor;

a plurality of radio frequency (RF) chains coupled to the at least one processor;

a plurality of antenna elements coupled to the plurality of RF chains, wherein each RF chain of the plurality of RF chains comprises a converter and a power amplifier, wherein the converter comprises:

a first circuit configured to perform a buck operation;

a second circuit configured to perform a boost operation;

an inductor coupling the first circuit and the second circuit; and a third circuit comprising a first resistor and a first diode, wherein the first circuit comprises a first field effect transistor (FET), a second FET, a first capacitor, and a first drive circuit for driving the first FET and the second FET, wherein the first capacitor is coupled to the first FET and the second FET, wherein the first drive circuit is coupled to the first FET, the second FET, and the first capacitor, wherein the second circuit comprises a third FET, a fourth FET, a second capacitor, a second drive circuit for driving the third FET and the fourth FET, and a first Zener diode, wherein the second capacitor is coupled to the third FET and the fourth FET, wherein the second drive circuit is coupled to the third FET, the fourth FET, the second capacitor, and the first Zener diode, wherein a first node coupled to the first drive circuit and the first capacitor is coupled to a second node coupled to the second drive circuit, the second capacitor, and the first Zener diode through the first resistor and the first diode without a switching circuit, wherein the first diode is configured to conduct current in a direction from the first node to the second node, in case that the third FET is on state and the fourth FET is off state based on the second drive circuit, wherein the first diode is used to reduce or prevent current flowing from the second node to the first node, in case that the third FET is the on state and the fourth FET is off state based on the second drive circuit, and wherein the second capacitor is charged based on current introduced from the first node through the first resistor and the first diode to maintain a voltage of the second drive circuit, in case that the third FET is the on state and the fourth FET is off state based on the second drive circuit.

12. The base station of the claim 11, wherein the first drive circuit is coupled to a gate of the first FET and a gate of the second FET, and wherein the second drive circuit is coupled to a gate of the third FET and a gate of the fourth FET.

13. The base station of claim 11, wherein the first capacitor is coupled to the first FET and the second FET at a third node to which a first source of the first FET and a second drain of the second FET are coupled, and wherein the second capacitor is coupled to the first Zener diode, the third FET, and the fourth FET at a fourth node to which a source of the third FET and a drain of the fourth FET are coupled, and is coupled to the first diode through the first resistor.

14. The base station of claim 13, wherein the inductor is disposed between the third node and the fourth node.

15. The base station of claim 11, wherein the first Zener diode is coupled to the second capacitor in parallel.

16. The base station of claim 11, wherein the converter further comprises a first bias structure and a second bias structure, wherein the first bias structure comprises a first bias power and a first bias diode and is coupled to the first node, and wherein the second bias structure comprises a second bias power and a second bias diode and is coupled to the second node.

17. The converter of claim 1, wherein the first drive circuit is directly coupled to the first FET and the first capacitor, and coupled to the second FET through a first inverter, and wherein the second drive circuit is directly coupled to the third FET, the second capacitor, and the first Zener diode, and coupled to the fourth FET through a second inverter.

18. The converter of claim 1, wherein the current flowing from the second node to the first node is prevented.

19. The converter of claim 1, wherein the first diode is configured to prevent reverse flow of the current conducting the direction from the first node to the second node.

20. The converter of claim 1, wherein the first diode is disposed in only one signal path established between the first node and the second node.

* * * * *